United States Patent
Bradley et al.

(10) Patent No.: US 6,574,798 B1
(45) Date of Patent: Jun. 3, 2003

(54) SYSTEM AND CONTROLLER FOR CONTROL AND DISTRIBUTION OF AUDIO AND VIDEO SIGNALS

(75) Inventors: Graham C. Bradley, Regina (CA); Alan Simpson, Regina (CA); Shane D. Newton, Regina (CA); Dennis E. Johns, Regina (CA); Oliver Cruder, Regina (CA)

(73) Assignee: Sasktel, Saskatchewan (CA)

( * ) Notice: Subject to any disclaimer, the term of this patent is extended or adjusted under 35 U.S.C. 154(b) by 0 days.

(21) Appl. No.: 09/290,901

(22) Filed: Apr. 12, 1999

(30) Foreign Application Priority Data

Feb. 3, 1999 (CA) .............................................. 2261009

(51) Int. Cl.$^7$ .......................... H04N 7/18; H04N 7/173; H04N 7/16; H04N 5/44; G05B 19/02

(52) U.S. Cl. .......................... 725/153; 725/78; 725/110; 725/82; 725/139; 725/151; 348/734; 340/825.22

(58) Field of Search ................................ 725/110, 4, 78, 725/82, 83, 104, 98, 99, 100, 117, 120, 122, 139, 131, 151; 340/825.22, 825.24, 825.25, 825.69, 825.72; 348/734

(56) References Cited

U.S. PATENT DOCUMENTS

| | | | |
|---|---|---|---|
| 3,911,204 A | 10/1975 | Spinelli | 178/5.1 |
| 3,968,327 A | 7/1976 | Gregg, III | 178/6.8 |
| 4,008,369 A | 2/1977 | Theurer et al. | 358/84 |
| 4,590,516 A | 5/1986 | Abraham | 358/86 |
| 4,626,848 A | 12/1986 | Ehlers | 340/825.69 |
| 4,710,955 A | 12/1987 | Kauffman | 380/10 |
| 4,751,581 A * | 6/1988 | Ishiguro et al. | 358/194.1 |
| 4,763,191 A | 8/1988 | Gordon et al. | 358/86 |
| 4,792,972 A | 12/1988 | Cook et al. | 380/20 |
| 4,907,079 A | 3/1990 | Turner et al. | 358/84 |
| 4,920,432 A | 4/1990 | Eggers et al. | 360/33.1 |
| 5,046,093 A * | 9/1991 | Wachob | 380/20 |
| 5,206,722 A * | 4/1993 | Kwan | 358/86 |
| 5,410,326 A | 4/1995 | Goldstein | 348/134 |
| 5,455,619 A | 10/1995 | Truckenmiller et al. | 348/8 |
| 5,475,740 A * | 12/1995 | Biggs | 379/91 |
| 5,512,963 A * | 4/1996 | Mankovitz | 348/725 |
| 5,521,631 A * | 5/1996 | Budow | 348/7 |
| 5,570,415 A * | 10/1996 | Stretton | 379/110 |
| 5,619,251 A * | 4/1997 | Kuroiwa et al. | 348/12 |
| 5,659,653 A * | 8/1997 | Diehl et al. | 386/46 |
| 5,815,297 A * | 9/1998 | Ciciora | 359/146 |
| 5,907,322 A * | 5/1999 | Kelly et al. | 345/327 |
| 6,124,854 A * | 9/2000 | Sartain | 345/327 |
| 6,208,384 B1 * | 3/2001 | Schultheiss | 348/552 |
| 6,209,132 B1 * | 3/2001 | Harrison et al. | 725/141 |
| 6,226,794 B1 * | 5/2001 | Anderson | 725/131 |
| 6,262,780 B1 * | 7/2001 | Ho et al. | 348/734 |
| 6,396,549 B1 * | 5/2002 | Weber | 348/734 |

FOREIGN PATENT DOCUMENTS

| | | |
|---|---|---|
| EP | 0 416 455 A2 | 3/1991 |
| WO | WO 96/32815 | 10/1996 |

* cited by examiner

Primary Examiner—Andrew Faile
Assistant Examiner—Son P. Huynh
(74) Attorney, Agent, or Firm—Gates & Cooper LLP

(57) ABSTRACT

The object of the invention is to provide a system and controller for distribution of audio/video signals on a pay-for-use basis, to a customer in a controlled environment such as a motel, hotel, bus station, bar or apartment building. The system includes a global authorization computer which transmits authorization to the customer over a telephone line. The customer has a telephone line/television control interface which receives the dual-tone multi-frequency authorization and allows the customer to select the authorized channel for a defined length of time. Without authorization, the telephone line/television control interface will deny the customer's attempt to tune his television to a pay-for-use channel. When the authorized time expires, the telephone line/television control interface tunes the customer's television to a non-pay-for-use channel. Additional options and embodiments are also presented.

8 Claims, 14 Drawing Sheets

SYSTEM AND CONTROLLER FOR CONTROL AND DISTRIBUTION OF AUDIO AND VIDEO SIGNALS

The present invention relates generally to coordinated control of audio and video signals among a number of devices, and more specifically, to a system, method and controller for distribution of audio and video signals on a pay-for-use basis in a controlled environment.

BACKGROUND OF THE INVENTION

A broad range of television appliances are available which allow users to access various audio and/or video features and services. Such appliances would include video cassette recorders, high fidelity sound decoders, satellite dishes and set-top boxes which provide internet over television and pay-per-view services.

It is common to operate television sets and television appliances using hand-held remote control devices. Requiring multiple remote controllers to operate these appliances compromises the convenience that a remote control provides, therefore, universal remote controllers have been made available which may operate a number of appliances from a single remote control. In order to communicate with a plurality of appliances, such remote controllers must be programmable to transmit in the protocol that each piece of equipment understands.

Because such universal remote control devices must transmit in a number of different protocols, they require each specific appliance to be identified so that the appropriate signal protocol can be transmitted. Identifying each device and sending commands particular to that device is at best inconvenient and slow.

The coordination of a number of television appliances is aggravated by the fact that most television appliances are operable to transmit and receive on only one or two predetermined channels. For example, it is common to see such appliances operable to transmit on either channel 3 or 4. When operating such equipment, it is necessary for the User to ensure that the necessary video switches, and input and output channels are coordinated. In a simple example of a pay-per-view descrambler, the User must check the descrambler to identify its output channel, tune the television set to that channel, and ensure that the video switch in the set-top box is set to send the de-scrambled signal to the television set and not the signal from the line in. Such implementations are inconvenient as the User must be aware of the input and output channels, and video switch settings for each television appliance. In a complex system, it is clearly a difficult task to coordinate all pieces of equipment.

One particular industry, the pay-per-view industry, generally relies on set top boxes-to provide audio and/or video services to specific Users. Pay-per-view is a method of distributing video signals that allows Users to select specific programs such as movies or sporting events and to pay only for these selections. This is in contrast to standard video distribution systems which make access to a broad range of programming available to Users for a flat fee.

One sub-segment of this industry is the institutional pay-per-view market. Institutional environments such as hotels and hospitals have implemented pay-per-view systems, but the existing systems are generally expensive, complex, or require manual interaction. Such systems are inconvenient in hotels and hospitals, and are completely impractical to implement in small environments such as motels.

Generally, institutions distribute television or video signals on a local cable network which allows equal access by all Users. In order to provide pay-per-view signals over an otherwise open network, the pay-per-view signals are secured in some manner to prevent Users from viewing them without paying. Two existing security methods are to encode the pay-per-view signals, or to block the video signals at the unauthorized User's room.

One such system employs filters in each User's room which block the pay-per-view video signals on the local cable network from being received by the User's television. The User may call the hotel office to schedule a pay-per-view selection and in response, a special carrier frequency is returned to the user's room via the telephone line. This special carrier frequency is picked up by a telephone/television interface in the User's room which unblocks the filtering of the video signal on the selected channel.

This method requires either manual control at the hotel office, or a sophisticated computer to control and generate the carrier signals. Manual control is costly in that it requires a specially trained employee to spend time responding to the request and programming the equipment. Manual control is also prone to error and requires twenty-four hour attendance in order to offer the video service continuously. Clearly, this is not practical in the environment of a small motel. Having a local computer to implement such a system automatically would also be too costly for a small motel.

Another solution is to scramble the pay-per-view video signals at the front office and to distribute the scrambled signal over the local cable network. The User contacts the front desk by telephone and a de-scrambling code and user address is returned either over the telephone line or via the local cable network itself. In either case, a sophisticated encoding and control system is required at the hotel office and sophisticated decoding and control equipment is required in each User's room. As a result, these systems are expensive and generally require trained operators.

The solutions described above can only be implemented in limited environments. They do not, for example, have the functionality to be implemented in bus stations, airports or bars, in which the customer is not identifiable and does not have a running account. Bus stations, airports or bars are still controlled environments in that the operator may install whatever equipment he requires to offer services, and to control access to these services. It is desirable to offer pay-per-view services in such controlled environments.

Pay-per-view services provided by local television cable providers have a more difficult environment to deal with than institutional pay-per-view because the controlled environment is not within the User's premises. If a signal is distributed freely across the local cable network, each User will have access to it within his private house or apartment. Even if this signal is scrambled or otherwise encoded, the User may be able to unlawfully tamper with the incoming encoded signal.

The above systems are also generally restricted in the services that they can provide. Pay-per-view systems are typically restricted to the provision of a limited number of finite products determined by the provider, such as specific movies and programs. There is a market demand to provide greater flexibility, including viewing television channels for a certain number of hours, having access to direct-to-home satellite and internet-over-TV services. Such services are generally described as pay-for-use.

There is therefore a need for system and controller which reduces the amount of coordination required of a User in operating television sets and television appliances. There is also a need for a system and controller which allows distribution of video signals on a pay-for-use basis in a controlled environment, which is inexpensive to implement and easy to operate.

SUMMARY OF THE INVENTION

It is therefore an object of the invention to provide a system, method and controller for coordinated control of audio and/or video signals, and a system, method and controller for distribution of audio and/or video signals on a pay-for-use basis in a controlled environment.

One aspect of the invention is broadly defined as a television system comprising a television set having a video signal input; a television appliance being electrically connected to the video signal input of the television set; a hand-held remote control device being operable to transmit a tuning signal representing a selected channel; the television appliance being operable to: receive the tuning signal representing the selected channel; and transmit a video signal to the television set via the electrical connection at the frequency corresponding to the selected channel; and the television set being operable to: receive the tuning signal representing the selected channel; and receive and display the video signal from the television appliance at the frequency corresponding to the selected channel.

Another aspect of the invention is defined as a system for distributing video signals comprising: at least one customer location having: a television set having a video signal input; a telephone line/television control interface being electrically connected to the video signal input of the television set; and a hand-held remote control device being operable to transmit a tuning signal representing a selected channel; a local source of video signals; a global authorization computer; a local video signal distribution network interconnecting the local source of video signals with the telephone line/television control interface; a telecommunications network for interconnecting the global authorization computer with the telephone line/television control interface; the television set including means for receiving the tuning signal and tuning the television set to the selected channel; the global authorization computer including means for issuing an authorization packet to the telephone line/television control interface via the telecommunications network; and the telephone line/television control interface including: means for receiving the tuning signal from the hand-held remote control device; means for receiving an authorization packet authorizing viewing of a pay-for-use channel, from the global authorization computer via the telephone network; and controlling means responsive to the selected channel being the pay-for-use channel and the authorization to view the pay-for-use channel being received by passing the selected channel at the transmitted frequency of the selected channel.

Another aspect of the invention is defined as a telephone line/television control interface comprising: means for receiving a request to tune the television to a selected channel; means for receiving an authorization packet authorizing viewing of a pay-for-use channel, from the global authorization computer via the telephone network; and controlling means responsive to the selected channel being the pay-for-use channel and the authorization to view the pay-for-use channel being received by passing the selected channel at the transmitted frequency of the selected channel.

Another aspect of the invention is defined as a global authorization computer comprising: means for storing a plurality of remote control protocols; means for receiving a request to program a telephone line/television control interface to a selected one of the plurality of remote control protocols; means for transmitting a selected one of the plurality of remote control protocols to the telephone line/television control interface; and means for issuing an authorization packet in dual-tone multi-frequency format containing authorized user room identification, authorized channel and authorized period of time.

In a further aspect of the invention, there is provided a method of distributing video signals in an environment with at least one customer location having a television set having a video signal input, a telephone line/television control interface being electrically connected to the video signal input of the television set and a hand-held remote control device being operable to transmit a tuning signal representing a selected channel, a local source of video signals, a global authorization computer, a local video signal distribution network interconnecting the local source of video signals with the telephone line/television control.interface, and a telecommunications network for interconnecting the global authorization computer with the telephone line/television control interface, the method comprising the steps of: the global authorization computer issuing an authorization packet to the telephone line/television control interface via the telecommunications network; the television set responding to the tuning signal by tuning the television set to the selected channel; and the telephone line/television control interface responding to the authorization packet by allowing the selected channel to be passed to the television set at the transmitted frequency of the selected channel.

BRIEF DESCRIPTION OF THE DRAWINGS

These and other features of the invention will become more apparent from the following description in which reference is made to the appended drawings in which.

DETAILED DESCRIPTION OF PREFERRED EMBODIMENTS OF THE INVENTION

Figure 1:
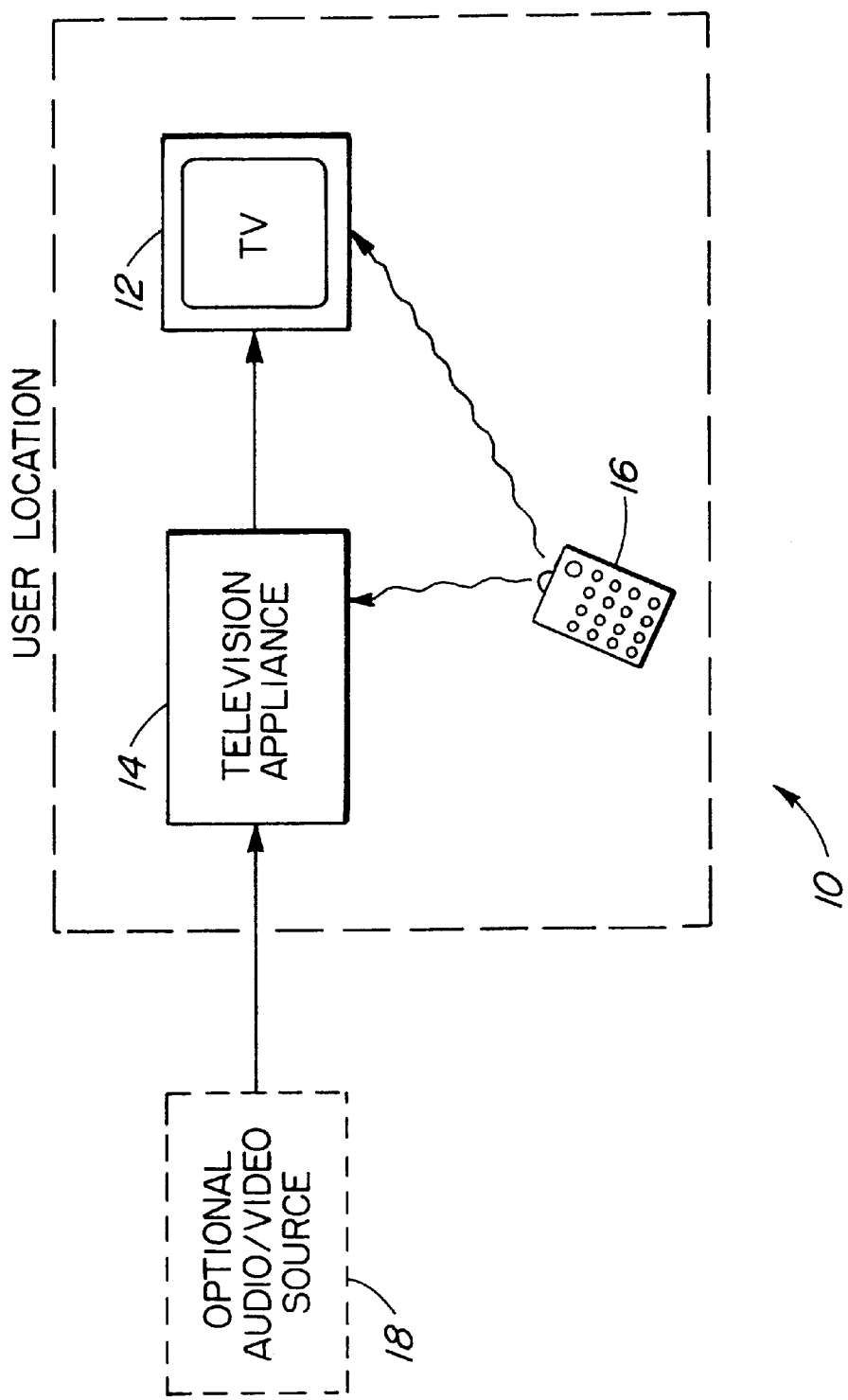
FIG. 1 presents a block diagram of the general system 10 in a manner of the invention.

An example of a solution to the problem of coordinating televisions and television appliances is presented as a block diagram in FIG. 1. This figure presents a system 10 which includes a television set 12 and a television appliance 14 electrically connected to the video signal input of the television set 12, at a User location. A standard hand-held remote control device 16 is used to transmit a tuning signal representing a selected channel. The television appliance 14 is operable to receive the tuning signal representing the selected channel and will transmit its video and/or audio signal output on the frequency corresponding to the selected television channel. This video and/or audio signal is transmitted to the television set 12 via the electrical connection to the video signal input of the television set 12. The television set 12 also receives the tuning signal from the hand-held remote control device 16 and adjusts its tuner to receive a signal at the corresponding frequency. The television set 12 thus receives the video and/or audio signal from the television appliance 14 and processes the video and/or audio signal to present it to the User.

Having the television appliance 14 and the television set 12 work in a coordinated effort in response to the same set of signals from the hand-held remote control device 16, the User may use a single hand-held remote control device 16 and does not have to worry about identifying the television appliance 14 and the television set 12 to the hand-held remote control device 16. The User does not have to identify the output frequency of the television appliance 14 and tune the television set 12 accordingly, because the television appliance 14 assumes that the television set 12 has been tuned to the channel identified by the hand-held remote control device 16, and it modulates its output to that frequency. The invention also does not require video switches to be set, because again, the television appliance 14 and the television set 12 receive the same set of signals from the hand-held remote control device 16 and may make assumptions about what the other device is doing.

There are a number of ways in which the television appliance 14 and the television set 12 may be designed to respond in a coordinated manner to a single set of signals from the User. In the preferred embodiment, the television appliance 14 includes a memory storing a plurality of remote control protocols for decoding the tuning signals from the hand-held remote control 16. The User merely selects the protocol which matches that of the television set 12. Integrated circuits are available commercially which contain the majority of the remote control protocols. Such devices are usually employed in universal hand-held remote control devices 16, but in the case of the invention, the protocol memory is generally included in the television appliance 14.

Alternatively, the television appliance 14 may be supplied with a learn infrared (learn IR) system, which is also commercially available technology and is intended for use in universal hand-held remote control devices. Learn IR allows an appliance to be taught how to respond to certain infrared signals from the universal hand-held remote control device. Programming a television appliance 14 with a learn IR system requires each command to be manually programmed and confirmed by transmitting each signal and identifying the signal to the television appliance. Though extremely flexible, learn IR is generally complicated and time consuming for customers to use.

Another alternative is to use a standard universal hand-held remote control device 16 that has been modified to transmit more than one set of signals for a given input. In the example of FIG. 1, having a television appliance 14 and a television set 12, the universal hand-held remote control device 16 would transmit two signals for each User input— one for the television appliance 14 and a second for the television set 12. This implementation may become cumbersome in an environment with a large number of television appliances 14. Other means for communication are described herein after.

In FIG. 1, the system is shown with an optional audio/video source 18, which may supply a broadband signal, such as a cable television signal, to the television appliance 14. This is intended to demonstrate that the television appliance 14 is not limited to applications where the television appliance 14 originates the video signal. It may also receive an input signal from an external audio/video source 18 such as a local cable television provider, which it either processes or simply passes on to the television set 12.

This general invention may be applied to the specific problems associated with providing a system for distributing video signals in a pay-for-use environment. An implementation of the invention which addresses the problems outlined above, is presented as a block diagram in FIG. 2. This figure presents an institutional pay-for-use system 20 for distributing audio and/or video signals, comprising at least one customer location 22 having: a television set 12 having a video signal input, a telephone line/television control interface 24 being electrically connected to the video signal input of the television set 12, and a hand-held remote control device 16. As described above, the hand-held remote control device 16 may transmit a tuning signal that enables both the television set 12 and the telephone line/television control interface 24 to understand which television channel is being selected.

A local source of video signals 26 provides the pay-for-use video signal that the User wishes to view, and a global authorization computer 28 is provided which administers the system 20. A local video signal distribution network 30 interconnects the local source of video signals 26 with the telephone line/television control interface 24 in the same manner as a standard television signal distribution network.

A telecommunications network 32 interconnects the global authorization computer 28 with the telephone line/television control interface 24 allowing the global authorization computer 28 to issue authorization packets to the telephone line/television control interface 24 via this telecommunications network 32. The telephone line/television control interface 24 may be characterized as performing three main tasks:

1. receiving the tuning signal from the hand-held remote control device 16;
2. receiving authorization packets authorizing viewing of a pay-for-use channel, from the global authorization computer 28 via the telephone network 32; and
3. responding to a selected channel being a pay-for-use channel and authorization to view the pay-for-use channel being received by passing the selected channel to the television set 12 at the transmitted frequency of the selected channel.

The standard television set 12 in the system 20 has means for receiving the tuning signal from the hand-held remote control device 16 and means for tuning the television set 12 to the selected channel. The television set 12 will only receive the output signal that the telephone line/television control interface 24 transmits to it. If the User does not have authorization from the global authorization computer 28 to view a certain pay-for-use channel that is selected using the hand-held remote control device 16, then the video signal for that channel is not passed by the telephone line/television control interface 24 to the television set 12.

This system 20 may also have a telephone 33 at the customer location 22, allowing the User to contact the global authorization computer 28 via the telecommunications network 32 to select and order audio and/or video programming. Advantageously, this telephone 33 is on the same telephone line as the telephone line/television control interface 24. Use of the telephone 33 will be described herein, and in particular with respect to FIGS. 7a, 7b and 7c.

Other embodiments will be described in greater detail hereinafter, but in a simple example of the invention, this system 20 allows a pay-for-use video tape to be played on the local source of video signals 26 at the front office of a small motel. The video tape may be played on a predetermined schedule which may be posted at the front desk or in each room of the motel. The video signal will be available to each television set 12 connected to the local video signal distribution network 30, but a telephone line/television control interface 24 in each room will not pass the pay-for-use video signal to the television set 12 unless authorization is received. Generally, the interconnection between the telephone line/television control interface 24 and the television set 12 will be made using tamper-proof connectors to deter attempts to obtain the pay-for-use signal without authorization.

Only when the global authorization computer 28 transmits the appropriate authorization code and instructions to the telephone line/television control interface 24 over the telecommunications network 32 will the telephone line/television control interface 24 pass the pay-for-use signal to the television set 12 on its transmitted channel. The detailed operation of the telephone line/television control interface 24 will be outlined hereinafter.

It is preferred that the authorization packet be transmitted from the global authorization computer 28 to the telephone line/television control interface 24 over the telecommunications network 32 in a dual-tone multi-frequency format. This format is the easiest to implement, the least expensive and most reliable, but other formats may be used as known in the art. This authorization packet contains an authorized user room identification, authorized channel and authorized period of time to said telephone line/television control interface via said telecommunications network.

Accordingly, it is preferred that the telephone line/television control interface 24 have a controlling means responsive to the selected channel being a pay-for-use channel, the authorization to tune the television set 12 to the pay-for-use channel being received and the authorized user room identification corresponding to an internally coded room identification, by passing the selected channel at the transmitted frequency of the selected channel.

In the application of the invention to an institutional pay-for-use system 20, the local source of video signals 26 is generally located in an institutional environment having means for receiving billing information from the global authorization computer 28 via the telecommunications network 32, and global authorization computer 28 has means for transmitting the billing information to an administrative office of the institutional environment via the telecommunications network 32. The operation of the billing systems and alternatives will be described in greater detail with respect to FIG. 6, but may be as simple as a facsimile transmission from the global authorization computer 28 to a facsimile machine located in the administrative office of the institutional environment.

This system 20 removes the authorization, administration and maintenance functions from the administrative office of the institutional environment, executing them instead at a central computer, the global authorization computer 28. This way, the operator of the motel does not have to play a direct part in any given transaction. With the invention, a motel operator's interaction may be limited, for example, to loading new video tapes into the local source of video signals 26 from time to time. Therefore, the motel operator does not require training, does not have to attend the equipment twenty-four hours a day, or spend time operating the system 20.

This system 20 also is less costly than completely local systems, because the global authorization computer 28 may operate several motel locations at the same time. This reduces the overhead cost more or less proportionately with the number of motels that the global authorization computer 28 services. Because communication with the global authorization computer 28 is performed via the telephone network 32, the global authorization computer 28 does not even need to be in the same geographic area as the motels that it services.

Because the negotiation of the services is between the customer and the global authorization computer 28, it is possible to implement the invention in any controlled environment, including bus stations, airports, apartment buildings, bars, nursing homes or cruise ships. Although the customer is not necessarily identifiable and does not have a running account, the global authorization computer 28 could simply prompt the customer for a valid credit card number to be entered on the telephone keypad, in order to debit the customer for the services. This system 20 may also be implemented in a non-institutional environment which will be described with respect to FIG. 5.

This system 20 is also not limited in the audio/video services that are to be provided, allowing for pay-for-use rather than being limited to pay-per-view. The global authorization computer 28 may be programmed to prompt the customer to select between many audio/video services and then to select the specifics of those services. This allows viewing of special television channels for a certain number of hours, access to direct-to-home satellite, regular satellite, internet-over-TV, digital audio or other services that can be provided over the local cable network 30. Any such services could be mapped onto particular channels of the local cable network 30, and access controlled by the system 20 of the invention.

From the perspective of the customer, he will now have access to pay-for-use services that he could not access before. While pay-per-view services had only been available in large hotels in the past, the invention will now allow smaller controlled environments such as motels, bars and bus stations to provide their customers with access to pay-for-use services. As well, because of the cost-efficiency of the centralised control and no requirement for a sophisticated encryption and decryption system, these services will be offered to the customer at a low cost. The invention also allows the customer to have full functionality of his television set 12 without the inconvenience and confusion of a second remote control 16, as some systems require.

The three major components of the system will now be described in greater detail: the telephone line/television control interface 24, the global authorization computer 28, and the local source of video signals 26.

Figure 3:
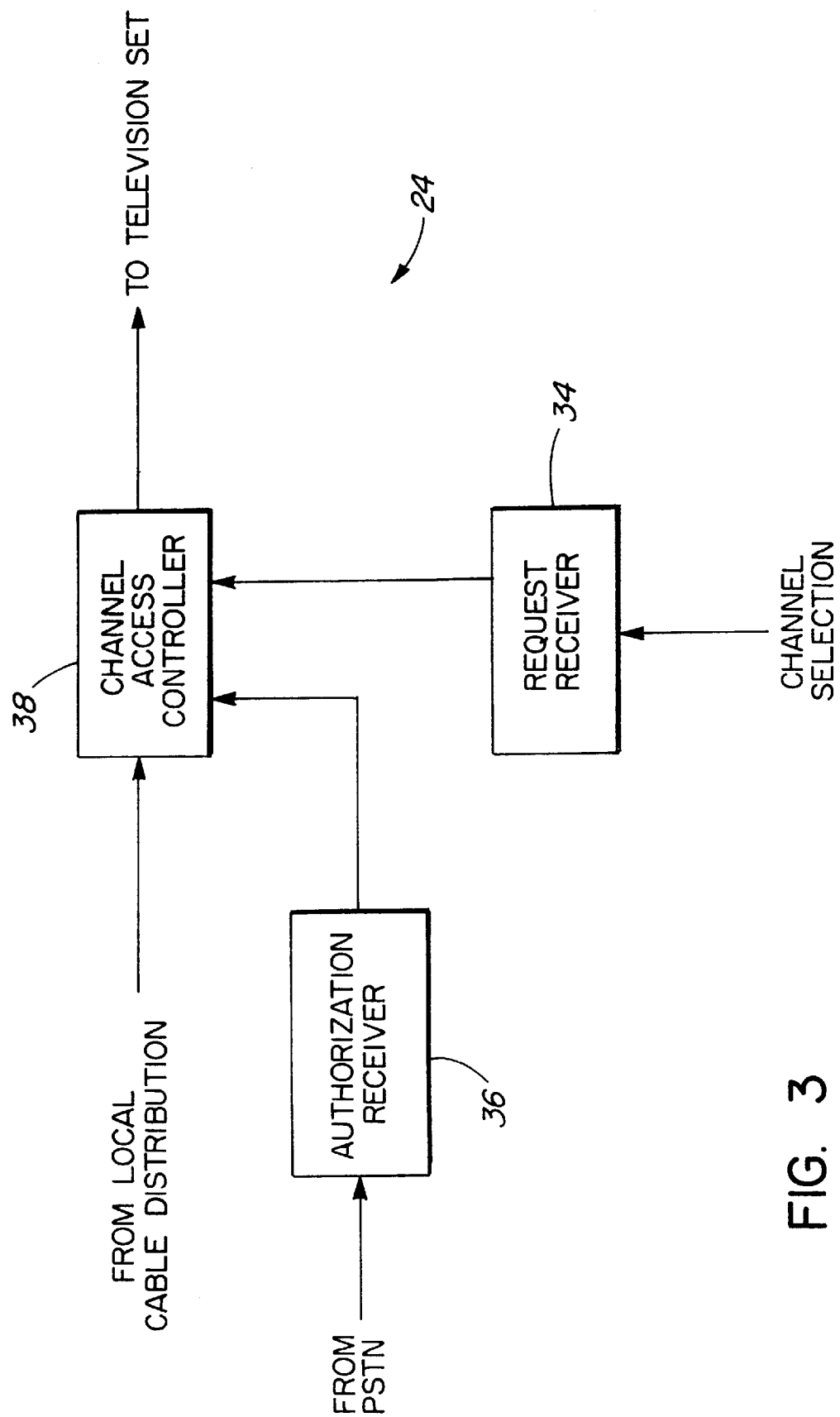
FIG. 3 presents a general block diagram of a telephone line/television interface 24 in a manner of the invention.

As described above, the telephone line/television control interface 24 prevents Users from tuning their television sets 12 to pay-for-use channels without the proper authorization. One such apparatus for performing this function is shown as a block diagram in FIG. 3. Broadly speaking, the telephone line/television control interface 24 comprises three components: a means 34 for receiving a request to tune the television set 12 to a selected channel; a means 36 for receiving an authorization packet authorizing viewing of a pay-for-use channel, from the global authorization computer 28 via the telephone network 32; and a controlling means 38 responsive to the selected channel being a pay-for-use channel and authorization to view the pay-for-use channel being received, by passing the selected channel to the television set 12 at the transmitted frequency of the selected channel.

The general operation of the telephone line/television control interface 24 is best described with respect to an example. If the User selects a non-pay-for-use channel using a hand-held infrared remote control 16, then the television set 12 will receive the request and tune itself to that receive that channel. The receiver 34 of the telephone line/television control interface 24 will also receive the tuning request and pass it to the channel access controller 38. If the channel corresponds to a non-pay for use channel, the channel access controller 38 will allow the video signal at the frequency corresponding to the selected channel received from the video signal source 18 or 26, to be passed to the television set 12.

If the selected channel is a pay-for-use channel, the channel access controller 38 will require authorization from the authorization receiver 36 before allowing the selected channel to pass to the television set 12. If the selected channel is a pay-for-use channel and no authorization is received, the television set 12 will have been tuned to the channel selected by the User with the hand-held infrared remote control 16, but it will not receive a signal for that channel because the channel access controller 38 will not allow the video signal at the frequency corresponding to the selected channel to be passed to the television set 12.

Figure 4:
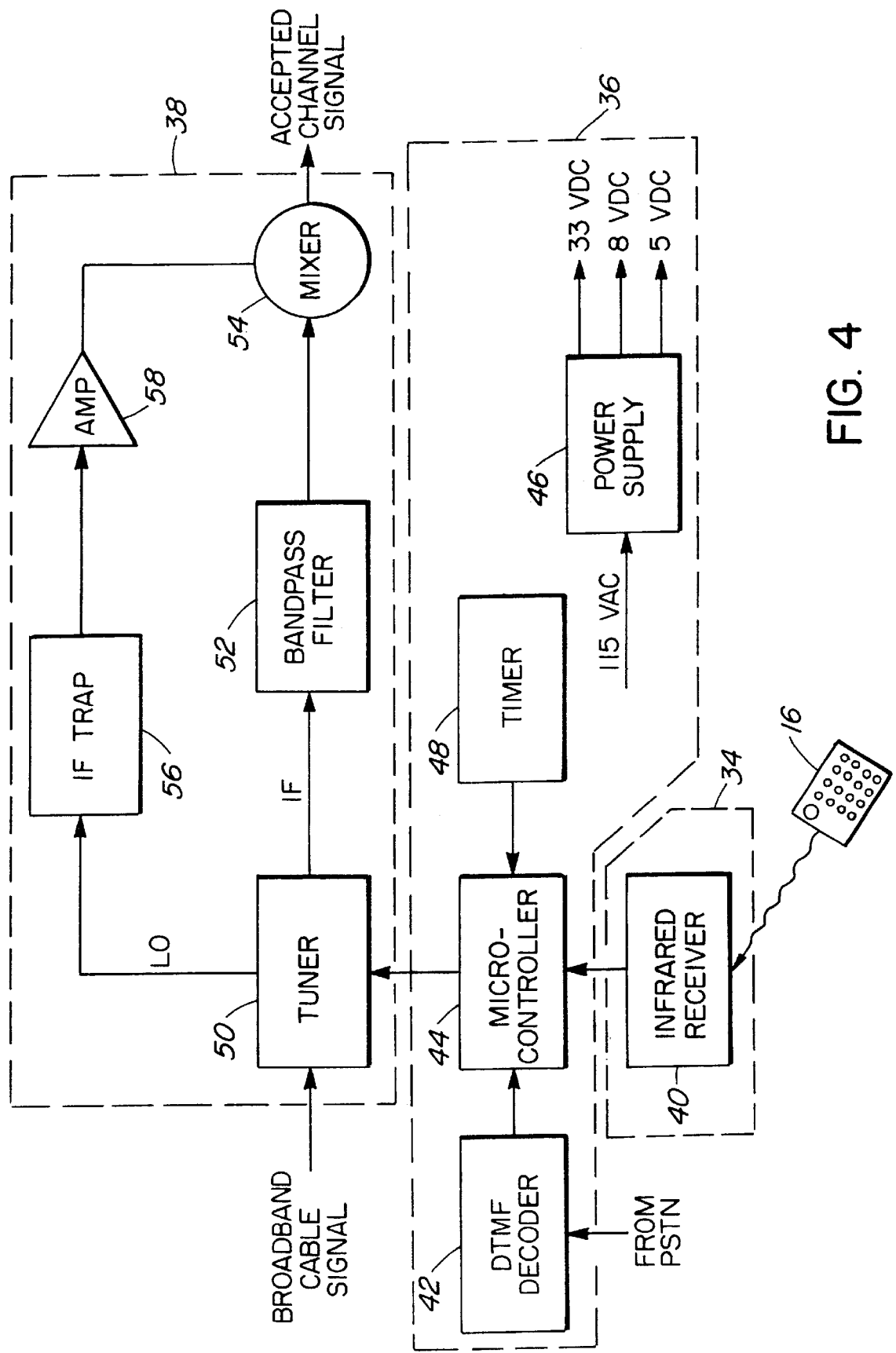
FIG. 4 presents a block diagram of a telephone line/television interface 24 in a preferred embodiment of the invention.

In the preferred embodiment of the invention, the telephone line/television interface 24 will comprise the arrangement of FIG. 4. In this embodiment, the request receiver 34 comprises a means for receiving a request to tune to a selected channel from a hand-held remote control device 16. As described above, this request receiver 34 is operable to receive and interpret transmissions from the remote hand-held remote control device 16 in the same manner as the television set 12.

The transmission from the hand-held remote control device 16 may use ultrasonic, UHF, infrared, or other electromagnetic or non-electromagnetic signals. As infrared is most common, it is described as the preferred embodiment of the invention. In order to be compatible with as many television sets 12 as possible, the infrared receiver 40 may be operable to understand the infrared signals from the hand-held remote control device 16 in a number of manners. In the preferred embodiment, it is intended that the infrared receiver 40 be pre-programmed with the most common infrared protocols, so that the User may program the telephone line/television interface 24 to respond to the same infrared protocol that the television set 12 responds to.

Generally, the telephone line/television interface 24 will not be able to understand commands from the hand held remote control device 16 until a protocol is coordinated between them. As universal hand held remote control devices 16 are common and inexpensive, the telephone line/television interface 24 could be delivered to the customer in a default protocol mode. This would require the customer to change the output of the universal hand held remote control device 16 temporarily to the default protocol to advise the telephone line/television interface 24 which protocol would match that of the television set 12. It is common for universal hand held remote control devices 16 to be provided with a table indicating how the universal hand held remote control device 16 it is to be set the most common infrared protocols, by manufacturer and model number of television set 12.

Alternatively, the communication protocol of the telephone line/television interface 24 could be set manually, possibly using selector switches in the telephone line/television interface 24 itself. As well, the global access controller 28 may be programmed to provide downloadable sets of infrared protocols, so that a User may update his telephone line/television interface 24 by dialling the telephone number of the global access controller 28 and directing it to download the desired protocol to the telephone line/television interface 24.

In the preferred embodiment of the telephone line/television interface 24, the authorization receiver 36 will include a dual-tone multi-frequency (DTMF) decoder 42 as known in the art, to monitor the telephone network 32 and to receive the authorization packet from the global authorization computer 28 in a DTMF format. This DTMF decoder 42 is connected to the same telephone line that feeds the room telephone 33. An example of a DTMF decoder which may be advantageously used in the apparatus described is manufactured by Harris under part number CD22204. This DTMF decoder may also be implemented using a switch, hook and latch device and an additional convertor which translates the DTMF to digital format, or other arrangements which would be clear to one skilled in the art.

Telephony standards generally provide for 16 different DTMF tones, though only 12 may be generated by a standard touch-tone telephone. It is preferred, therefore, that the DTMF communication between the telephone line/television control interface 24 and the global authorization computer 28 via the telephone network 32 use all 16 available DTMF tones. This will prevent a User from generating tones on his telephone 33 which may confuse either the telephone line/television control interface 24 or the global authorization computer 28.

In the preferred embodiment, the authorization receiver 36 also includes a micro controller 44 though other circuit arrangements with similar functionality may also be designed. This micro controller 44 may also be implemented in a number of different manners, such as a microprocessor, digital signal processor (DSP) or application specific integrated circuit (ASIC), all of which are known in the art.

In this implementation of the invention, the micro controller 44 operates using digitally formatted inputs and outputs which are compatible with the digital output of the DTMF decoder 42 and the infrared receiver 40. However, the micro controller 44 could also be operable to receive and infrared signals from a simple infrared sensor, such as an infrared-sensitive transistor or diode, decoding the infrared signal internally. Similarly, the micro controller 44 could receive the DTMF signal from the telephone network 32 directly, and decode the DTMF tones internally.

Other arrangements could also be made, which would be clear to one skilled in the art. For example, a microprocessor could be used in lieu of the micro controller 44, but this would generally require external memory and additional timing control. Micro controllers generally have such functionality internally, reducing their overall cost and printed circuit board space. As noted above, some micro controllers or digital signal processors may be compatible with, or programmable to accept, the input and output signals of the invention without converting them to a digital format externally, allowing different implementations of the DTMF decoder 42 and infrared receiver 40 to be used. An ASIC, for example, may be manufactured which performs all of these functions on a single integrated circuit. Such implementations would not take away from the invention.

Generally, a power supply 46 is also necessary to provide power at the voltages required by the various components. Power may be obtained from the television, but preferably from a local 120VAC or 240VAC source as may be available in the region of implementation. It would not be expected that the telephone network 32 would have sufficient power to operate the unit. Power could also be obtained from the television set 12, but would generally be impractical.

A timer 48 may also be provided external to the micro controller 44. The operation of the timer 48 will be described in greater detail with respect to FIGS. 7a, 7b and 7c. Whether the functionality that the timer 48 provides is internal or external to the micro controller 44 is generally one of design preference and cost. This timer 48 may also be provided with battery backup so that timing is maintained in the event of a power failure.

In the preferred embodiment of the invention, the channel access controller 38 comprises a tuner 50 for receiving a broad-band television signal and modulating this signal to an intermediate frequency centred on the desired channel, a bandpass filter 52 for passing a frequency band corresponding to the bandwidth of a single channel and centred on the intermediate frequency, and a mixer 54 for receiving the bandpassed intermediate frequency signal and modulating this signal back to the frequency of the selected television channel. In other words, the channel access controller 38 allows only the single channel identified by the micro controller 44 to be passed through to the television set 12. It does this by tuning the selected channel to an intermediate frequency, passing only the single channel centered on the intermediate frequency and then modulating it back up to its original frequency. This process only allows a single, selected channel to be passed through the channel access controller 38.

The tuner 50 receives the broadband video input signal from the local video distribution network 30 and a signal from the micro controller 44 which identifies the channel to be tuned. Typically the tuning signal from the micro controller 44 is in the form of a serial digit signal, but the invention is not limited to such an implementation. The selected channel is then down-converted by the tuner 50 to an intermediate frequency, typically centered on 43.75 MHz. This is accomplished within the tuner 50 by mixing the incoming video signal with a local oscillator frequency that is 43.75MHZ above the centre frequency of the desired channel. The difference between the two mixing frequencies becomes the intermediate frequency (IF).

The IF signal is then filtered by a 6 MHZ wide bandpass filter 52 centred at 43.75 MHZ which removes signals in adjacent channels. This ensures that only the selected channel will be available for viewing on the television set 12.

To restore the chosen channel to its original place in the frequency spectrum, it is necessary to mix the IF signal with the local oscillator (LO) signal, resulting in an up-conversion; reversing the down-conversion performed by the tuner 50. The output of the mixer 54 contains only the desired television channel and its image.

A tuner 50 which advantageously performs the described function is manufactured by Temic under model number 4737PY5. An appropriate bandpass filter 52 is manufactured by Siemens under model number M4950M SAW with 6 MHZ bandwidth, and an appropriate mixer 54 manufactured by HP under model number IAM 81008. Clearly, equivalent devices would be known to one skilled in the art.

This implementation was employed rather than an adjustable active filter, because of superior performance. Existing programmable filters do not offer a high quality bandpass filter of 6 MHZ width over the 50–850 MHZ range that is desirable for the invention, at a comparable cost. However, such a device could be employed to realize the advantages of the invention.

As well, it is not necessary to use traditional television tuners 50 and their associated frequencies to realize the benefits of the invention. As described above, the apparatus of the invention translates the incoming signal down to a frequency that allows a static filter to remove all but the desired signal. The filtered signal is then returned to its original frequency. This functionality could be realized with a variety of mixers and filters, and at any intermediate frequency.

To maintain spectral quality, it is preferred that the local oscillator signal from the tuner 50 that feeds the mixer 54, be filtered by a trap 56 centred on the IF frequency. This filter 56 removes components of the IF signal that may have coupled or leaked onto the local oscillator signal path. This filtered local oscillator signal is then amplified with an amplifier 58 to provide a correct level for the mixer 54. An example of an appropriate amplifier would be model number MAR-3 as manufactured by Mini Circuits.

In the preferred embodiment of the invention, the authorization packet that is received by the DTMF decoder 42 will comprise an authorized User room identification, authorized channel and authorized period of time.

The telephone line/television interface 24 will confirm that the User room identification in the authorization packet matches a pre-programmed room identification to confirm that the received authorization packet matches the room. This will prevent a User from charging pay-for-use to another room. The room identification may be any arbitrary combination of numbers and letters, as the customer does not need to know what the room identification is. This room identification number could be stored in the telephone line/television interface 24 in a number of manners: the private branch exchange (PBX) of the motel may have a useful number associate with the room, the global authorization computer 28 could transmit a room code as part of an initialization routine, or the telephone line/television interface 24 could have internal selection switches which would be set when the unit is installed. Implementation of such verification methods would be clear to one skilled in the art.

The telephone line/television interface 24 identification is referred to as a room identification to simplify the discussion. As noted above, the identification stored in the telephone line/television interface 24 may be an arbitrary number, and where the invention is implemented in an environment such as a bus station, airport or bar, clearly, there is no association to a physical room.

The authorized channel of the authorization packet is used to identify the pay-for-use channel that the User has been authorized to view, and the authorized period of time indicates how long the User is allowed to view this authorized channel. In the preferred embodiment of the invention, the micro controller 44 will set an internal timer and when the authorization period expires, the television 12 will no longer receive a signal on the pay-for-use channel. The User will then have to tune his television 12 to a non-pay-for-use channel in order to receive a signal, or obtain authorization to view a new pay-for-use channel.

The telephone line/television control interface 24 may be mounted inside the television set 12, but it is preferable to mount it outside the television set 12 in a tamper-proof enclosure and have a plug and receptacle arrangement connecting it to the television set 12. The plug and receptacle arrangement allows the telephone line/television control interface 24 to be quickly removed to be repaired or replaced. Generally, the telephone line and television cable connections will be made with tamper proof connections as is the practice in such environments.

Figure 5:
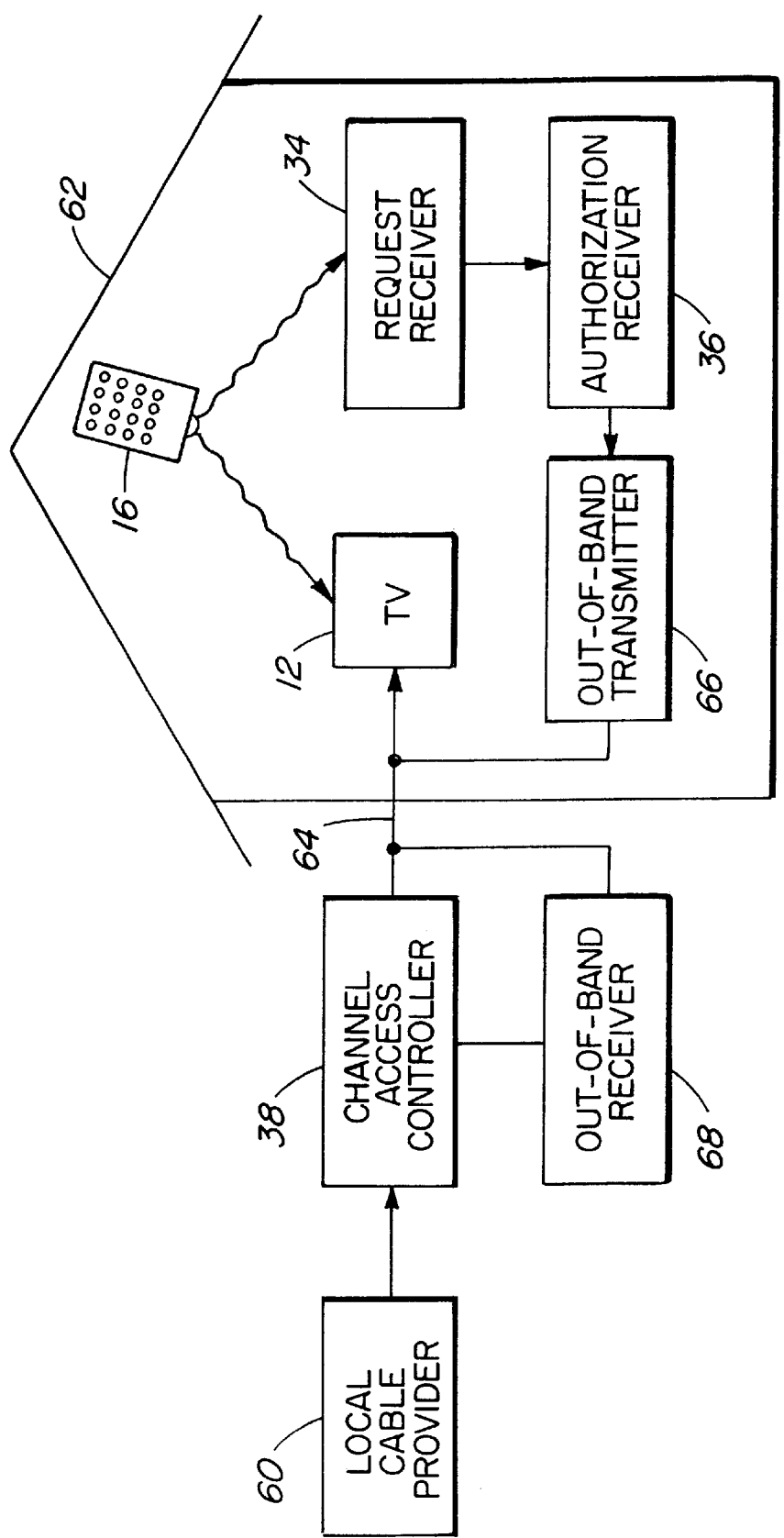
FIG. 5 presents a block diagram of a local cable distribution pay-for-use system employing a telephone line/television interface 24 with a remote channel access controller 46 in a preferred embodiment of the invention.

In FIG. 5 an embodiment of the invention is presented wherein the channel access controller 38 is installed remotely from the rest of the telephone/television interface 24, specifically the request receiver 34 and the authorization receiver 36. This arrangement allows the invention to be applied to an environment where the local cable provider 60 has no access or control of the User's environment 62. Examples would include apartment buildings and private homes.

As shown in FIG. 5, such an arrangement may consist of a channel access controller 38 mounted on the outside wall of the User's home 62, or mounted in the local cable distribution box. Similarly, an apartment building may have remote channel access controllers 38 installed at the distribution point for each User. If the cable for each User is split at an electrical closet on each floor of the apartment building, then the channel access controller 38 may be installed at that point. If the cable distribution occurs in one electrical room for the entire apartment building, then the channel access controllers 38 may be installed in that electrical room.

In this implementation the channel access controller 38 may communicate with the balance of the telephone line/television interface 24 inside the User's environment 62. Control signals may be transmitted from the authorization receiver 36 to the channel access controller 38 over the existing television cable 64 by using a frequency outside the band of the incoming video and/or audio signals. An out-of-band signal transmitter 64 in the User's environment 62 may receive and modulate the authorized channel signals from the authorization receiver 36, while a complementary out-of-band signal receiver 66 may be employed at the remote channel access controller 38 to receive and demodulate the out-of-band signal. The out-of-band signal transmitter 64 and receiver 66 may be coupled to the existing television cable 64 in a manner known in the art, such as capacitive coupling.

Figure 2:
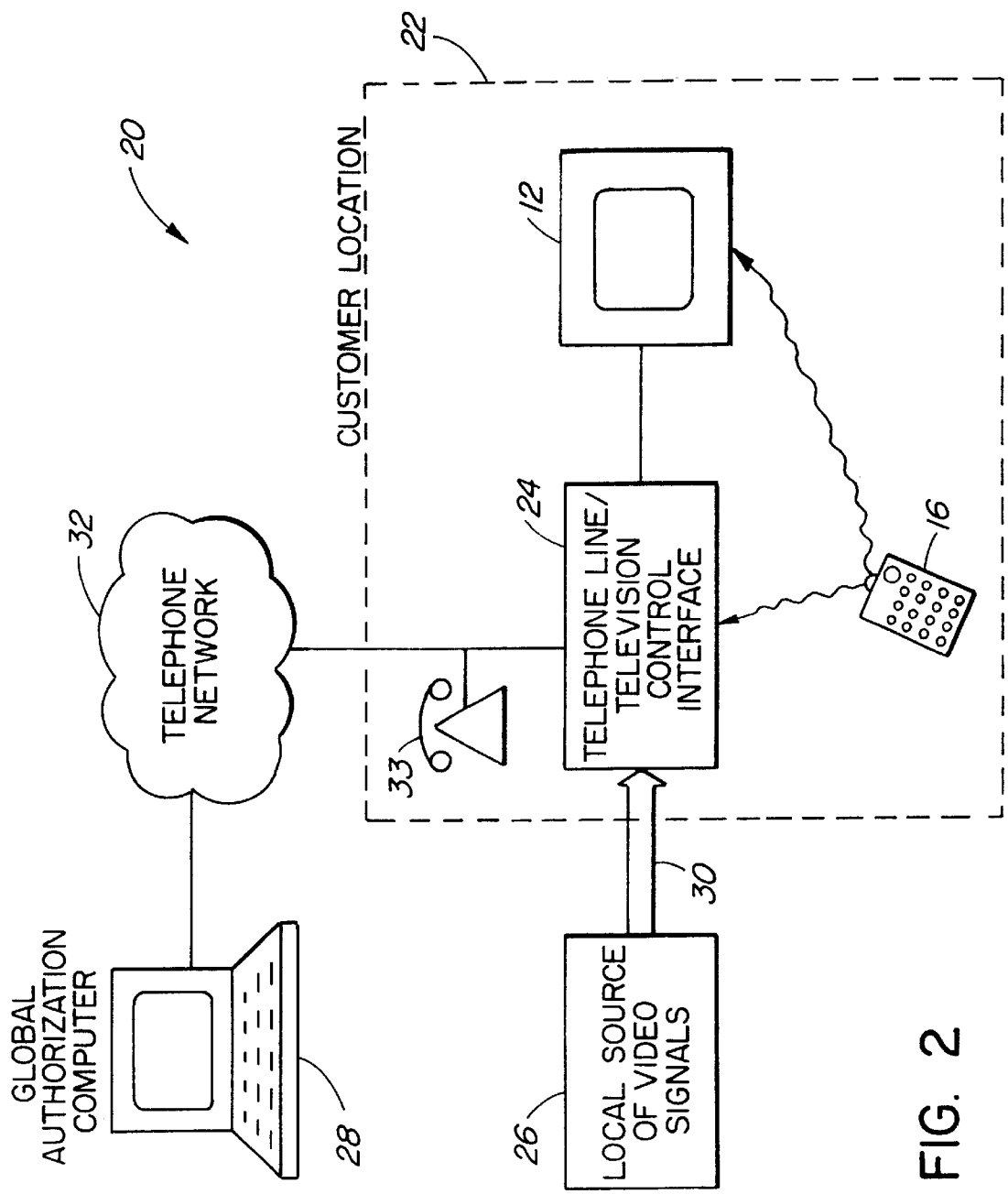
FIG. 2 presents a block diagram of an institutional video distribution system 20 in a manner of the invention.

The balance of the system is not shown in FIG. 5 for the sake of simplicity, but would require a system similar to that of FIG. 2. Completing this implementation would be clear to one skilled in the art from the description herein. As well, the division of the telephone line/television interface 24 components may also be varied with consideration for reliability, security and convenience. Such considerations and the resulting design changes would be clear to one skilled in the art.

As the telephone line/television control interface 24 only passes a single television channel to the television set 12, any channel selections made for example, from the selector switches on the television set 12 itself, will result in either a blank or snow-filled screen as there is no signal being received on that channel. Older television sets 12 will generally display snow if no signal is present, while most modern television sets 12 will blank the screen.

Certain commands will not be understood by all the television equipment in the system, but this does not compromise the operation of the system. For example, if a "play" command is issued to a system with a television set 12 and a video cassette recorder as the television appliance 14, the television set 12 will not understand the signal and will ignore it. The video cassette recorder will understand the "play" signal and execute it properly. Because the video cassette recorder may assume that the television set 12 is tuned to the channel indicated by the hand-held remote control device 16, it will modulate its output to that frequency.

In some applications it may be necessary to put additional intelligence into television appliances 14 than they typically have, but such modifications will be straightforward to one skilled in the art. The goal is that each piece of equipment understand what the balance of the components are doing, to the extent necessary for them to function as a group. The television set 12 for example, does not have to have such intelligence as it passively receives whatever signal is transmitted on the frequency it is tuned to. The channel of the television set 12 therefore determines how the modulation and video switches of the television appliances 14 should be set.

Of course, the telephone line/television control interfaces 24 may also be operable to understand other channel control operations such as returning to the previous channel, or incrementing or decrementing from the current channel. It would be clear to one skilled in the art how to include such features in implementing the invention.

Figure 6:
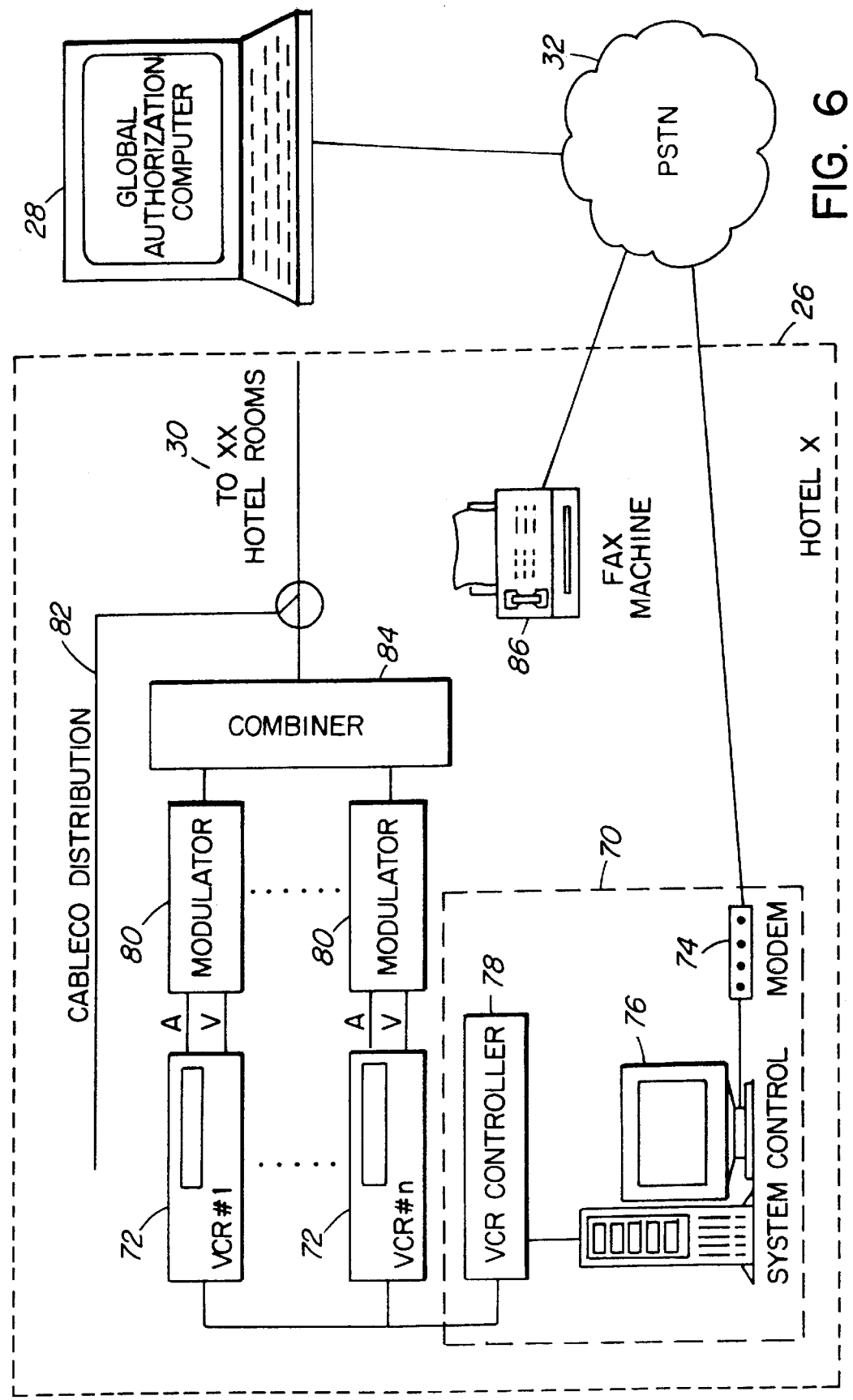
FIG. 6 presents a block diagram of a local source of video signals 18 in a preferred embodiment of the invention.

To simplify the description, reference thus far has only been made to a single video player. However, it is expected that the local source of video signals 26 will typically include a connection to a flat-rate television cable services, a number of video players, and possibly an interactive controller as shown in FIG. 6. In a simple implementation, the local source of video signals 26 may only comprise a single video player operating on a fixed schedule, which would require the motel operator to load video tapes, laser discs, or other prerecorded video media, into the video player at certain times. However, it is well within the skill in the art to provide a system controller 70 which may communicate with the global authorization computer 28 to control a number of video players 72, automatically rewinding and playing the video tapes by remote control. Such a system would typically comprise a modem 74, computer with appropriate control software installed and executing 76, and a video machine controller 78 allowing the computer 76 to direct execution of the controls on the video players 72.

The signals from the video players 72 could be modulated 80 onto the frequency of their corresponding pay-for-use channels and the various signals combined with that of a non-pay-for-use cable distribution supplier 82, typically the local cable television service. Video signal combiners 84 and modulators 80 are known in the art.

As regular interaction is not required between the video equipment and the motel operator, this equipment need not be installed at the front desk of the motel. It could be installed in a basement or closet, preferably close to the distribution center of the local cable network 30.

The administrative office of the motel will also generally have some means for billing users of the system 20. In a simple implementation, this may comprise a facsimile receiving machine 86, connected to the telephone network 32. In this case, the global authorization computer 28 would dial up the telephone number of the facsimile machine 86 and transmit billing information to the motel, which the motel operator would attach to the customer's invoice. Alternatively, the billing information could be transmitted to the system computer 76, which could either print the invoice out, or merge it with the motel invoicing system to give the user a combined room and pay-for-use invoice. These and other such implementations are well within the skill of the art, and variations do not limit the invention.

The third major component in the system is the global authorization computer 28. The global authorization computer 28 administers authorization of the pay-for-use channels by issuing authorization packets to users in dual-tone multi-frequency format. This authorization packet may be very simple, allowing a user to access all pay-for-use channels for an unlimited period of time, and not verifying the identity of the user. However, a more practical implementation is for the authorization packet to include a confirmation code, such as an authorized user room identification, as well as the authorized channel and authorized period of time.

Other variations would be clear to one skilled in the art, such as allowing access to all pay-for-use channels as a group, in which case specific channels need not be identified in the authorization packet, or offering access to a tier of channels in which case several channels may be identified in the packet. Similarly, an authorized period of time need not be specified if it is intended that the user be given unlimited time access for a flat rate.

The implementation of the global authorization computer 28 is most conveniently described with respect to the method of operation of the invention. This operation assumes the provision of a physical system as described above, including in particular: at least one customer location 22 having a telephone line/television control interface 24 and a television set 12 interconnected with the telephone line/television control interface 24, a local source of video signals 26, a global authorization computer 28, a local video signal distribution network 30 for interconnecting the local source of video signals 26 with the television set 12, and a telecommunications network 32 for interconnecting the global authorization computer 28 with the telephone line/television control interface 24.

As outlined above, the simple implementation of the invention is characterized by the global authorization computer 28 issuing an authorization packet to the telephone line/television control interface 24 via the telecommunication network 32 and the telephone line/television control interface 24 responding to the authorization packet by allowing the signal of the authorized pay-for-use channel to be passed to the television set 12 on the frequency that if is received. If the telephone line/television control interface 24 does not receive such an authorization packet, it does not allow the signal to be passed to the television set 12.

Typically, the global authorization computer 28 would be implemented as a computer or server system, comprising both hardware and software components. From the description of the invention herein, fabrication of such a global authorization computer 28 would be straightforward to one skilled in the art. The integration of such hardware and software components to realize the invention could be done in an almost unlimited number of combinations.

The detailed operation of the global authorization computer 28 will first be described with the method of operation of the complete institutional pay-for-use system 20, as outlined in the flow charts of FIGS. 7a, 7b and 7c, and then described with respect to the Authorization, Administration and Maintenance Routines as outlined in the flow charts of FIGS. 8a, 8b, 8c, 8d and 8e.

The user initiates the process at step 166 by dialling the telephone number of the global authorization computer 28 on his room telephone 33. This telephone number may be provided to the user along with promotional materials in a number of manners that would be clear to one skilled in the art. This could be as simple as a sales brochure in the motel room 22 or available at the front desk, or a more elaborate video preview channel on the television set 12. For example, the motel may provide a video preview channel simply by running a continuous broadcast of instructions and sample clips of available video signals on one or more non-pay-for-use channels.

The global authorization computer 28 picks up the user's telephone call at step 168, greets the user and prompts him to select a preferred language for interactive voice response communication, such as English, French or Spanish, as may be desired depending on the geographic area in which the invention is implemented. The greeting and prompting may be implemented using interactive voice response (IVR) techniques which are known in the art of telecommunications. The customer indicates his language preference by striking the corresponding number key on the keypad of his room telephone 33.

At step 170, the global authorization computer 28 identifies the institution the user is calling from by using call identification as known in the art. Typically, the user will be calling from an institution with a private branch exchange, but it could possibly be a private line. Either way, the global authorization computer 28 associates all the outgoing lines with the institution, so that it knows whether to send billing information to an administrative office, or to debit the customer directly.

If caller identification is available, the global authorization computer 28 continues with step 172. If caller identification is not available, the global authorization computer 28 prompts the user to identify the telephone number he is calling from at step 174, and user enters his telephone number on the keypad of his room telephone 33 at step 176.

The global authorization computer 28 will have a database record associated with the institution that has been identified in either step 170 or 176. This database record may contain details for the institution regarding outgoing telephone lines, room numbers, services available, free channels, costs, billing arrangements and other information which will be described in further detail hereinafter.

At step 172, the global authorization computer 28 prompts the user to enter his room number or a pre-assigned television number. The actual value of the number is arbitrary and is only required to coordinate authorization codes between the global authorization computer 28 and the telephone line/television control interface 24. The user indicates his room number using the keypad of his telephone at step 178.

When the global authorization computer 28 receives the user's room number or a pre-assigned television number, it confirms that this is a valid number at step 180 by referring to the database record for the institution. If it is not valid, it may prompt the user again, by returning to step 172. It may be desirable to monitor the number of times that an invalid number is entered, either hanging up on the user or locking out the room for a period of time if tampering is suspected.

If a valid entry is received, it may be desirable for the global authorization computer 28 to confirm the room or television number back to the user for verification using interactive voice response and requesting confirmation with a telephone keypad entry.

At step 182, the global authorization computer 28 then prompts the user for a pay-for-use selection, again using IVR. The global authorization computer 28 could either recite a complete list of options to the user, or refer to identification numbers on associated promotional material. To implement a pay-for-use system with a large number of optional services and lengths of time, a fairly sophisticated selection hierarchy may be required. Such selection trees are quite common in the art. The user enters his selection at step 184 using the keypad of his telephone 33.

Figure 7A:
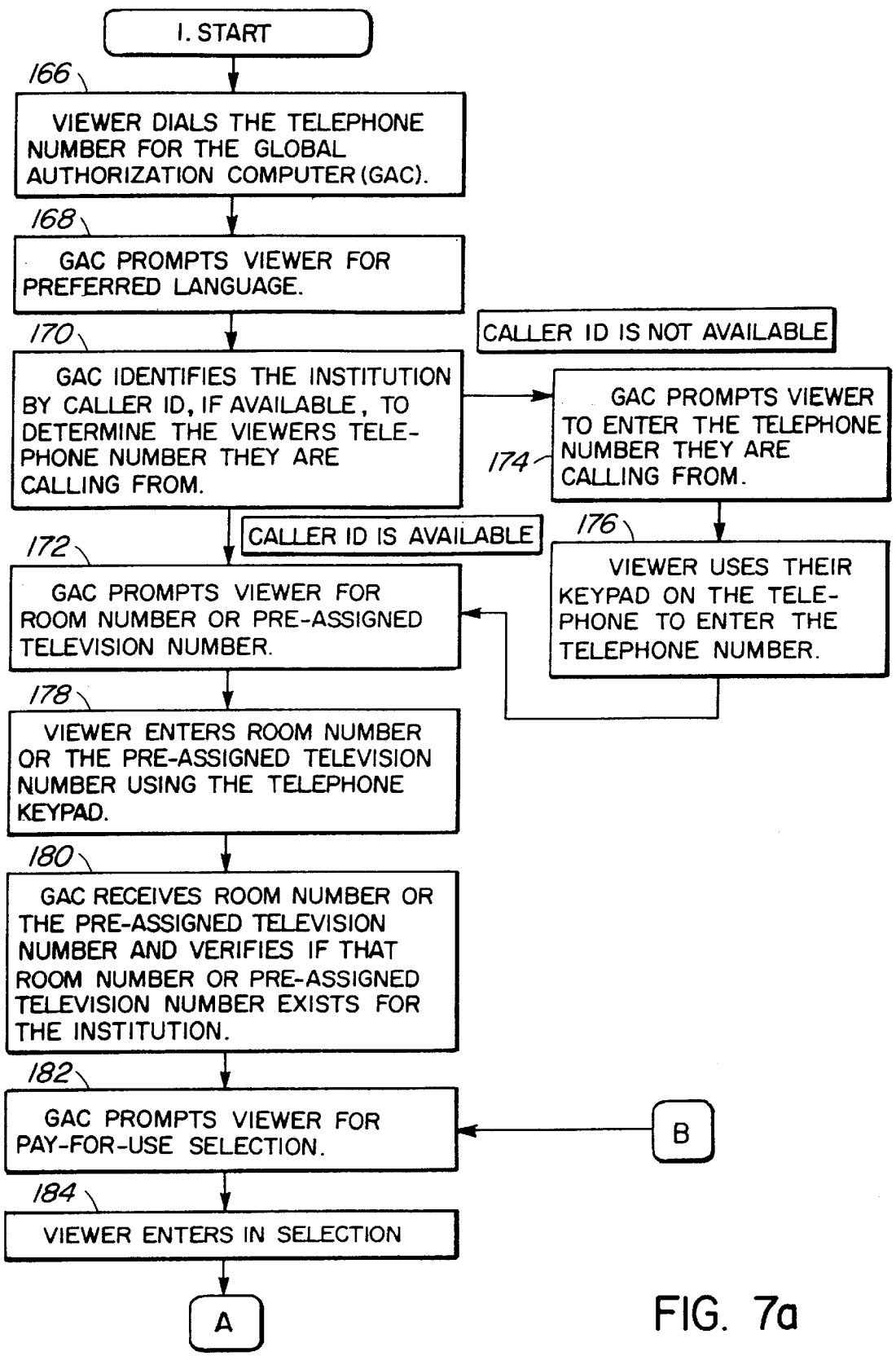
FIGS. 7a, 7b and 7c present a flow chart of the method steps of an institutional pay-for-use video distribution system 20 in a preferred embodiment of the invention.
Figure 7B:
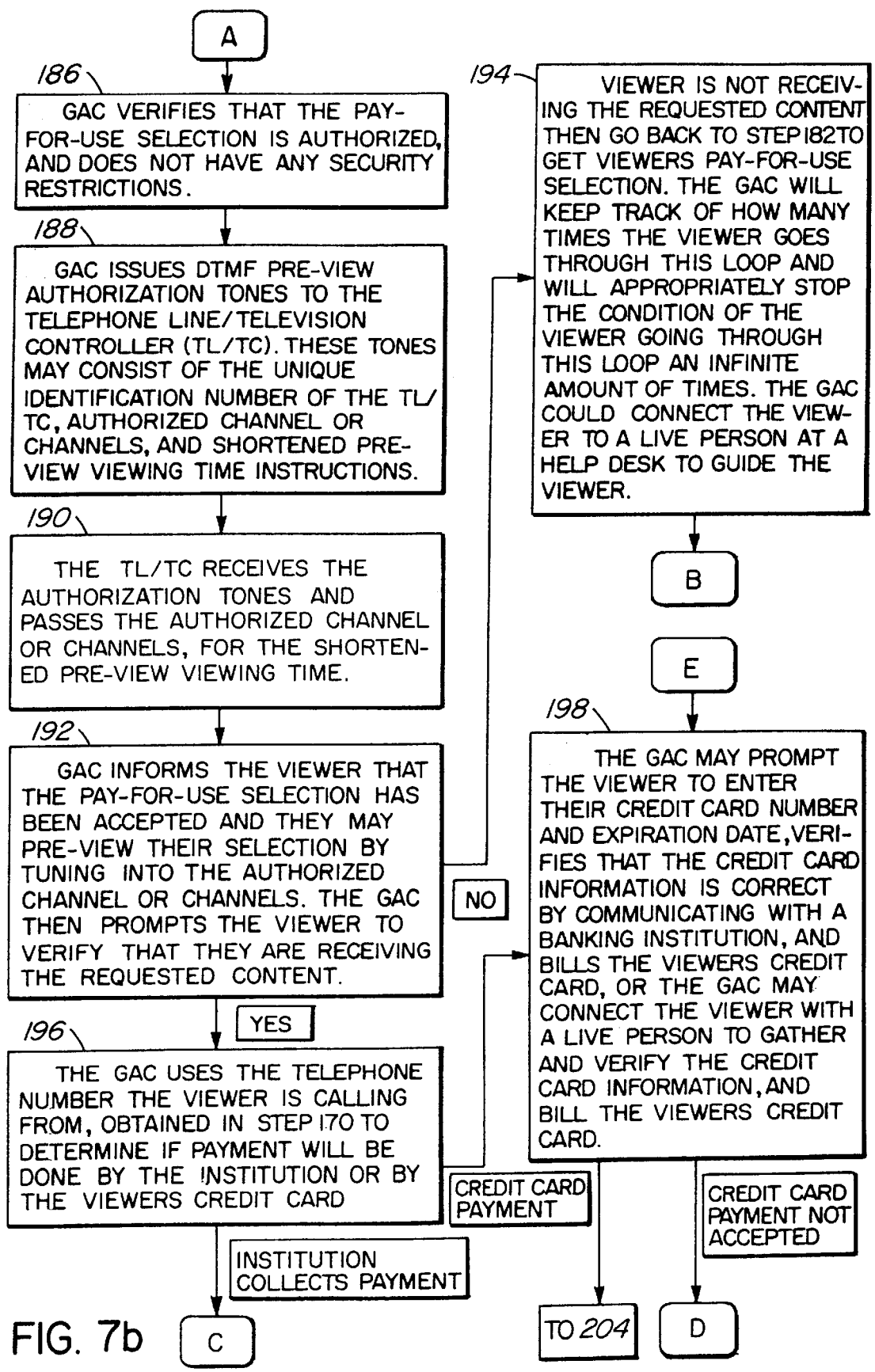

Once the user has made a selection, the global authorization computer 28 accesses the database record associated with the institution at step 186 in FIG. 7b and confirms that the room 22 is allowed to view the selection. This feature is provided to allow customers to disable certain channels, for example adult channels, from being ordered by their room. The customer may make the security restriction by contacting the global authorization computer 28, or by having the motel office make the request to the global authorization computer 28 on behalf of the customer. In the same manner, corporate clients may wish to have the pay-for-use service disabled entirely, to prevent employees from charging excessive costs to their rooms.

At this point, it may also be desirable to have the global authorization computer 28 confirm the selection back to the user.

The process now continues with step 188 where the global authorization computer 28 prepares and forwards an authorization packet back to the telephone line/television control interface 24. As noted above, the complexity of the authorization packet will depend on the functionality that the system 20 is required to have. In the preferred embodiment, the global authorization computer 28 will return an authorization packet at step 188 comprising the authorized user room identification, authorized channel and authorized pre-viewing period of time. This authorization packet will be in dual-tone multi-frequency format, and travel over the telecommunications network 32 to the telephone line/television control interface 24 in the users room 22.

The use of a short pre-viewing period gives the system 20 the flexibility of free sampling, and confirmation from the user that the desired product is being received correctly before invoicing the customer. This should reduce the number of arguments that the motel operator receives from customers who attempt to avoid paying for services.

The telephone line/television control interface 24 receives the authorization packet at step 190 and confirms that the packet has the same authorized room identification as the telephone line/television control interface 24 has been programmed for. Once this verification is made, the telephone line/television control interface 24 will allow the user to select the pay-for-use channel during the authorized pre-viewing period. The operation of the telephone line/television control interface 24 is described in greater detail above.

The global authorization computer 28 then transmits interactive voice response instructions to the customer advising him at step 192 that the authorization packet has been sent, and asking him to tune his television set 12 to the authorized pay-for-use channel or channels and to confirm its correct operation by entering the appropriate code on his telephone 33 keypad.

If the customer indicates that the authorization has failed, the global authorization computer 28 monitors the number of failures at step 194, and returns control to step 182 of FIG. 7a. If a user fails a.number of times, for example three times, the global authorization computer 28 may lock out the room or transfer the telephone call to a call centre which allows the customer to obtain person to person assistance.

It is not necessary for the global authorization computer 28 to transmit a reset command to the telephone line/television control interface 24 because of the short pre-viewing authorization period. Once this short time period expires the signal for the selected channel will be blocked from the television set 12.

If the customer indicates that the authorization has been successful, the global authorization computer 28 accesses the institution database to determine whether payment should be made through the institution or directly from the customer at step 196.

If payment is to be made directly from the customer, then the global authorization computer 28 will prompt the user at step 198 to advise a valid credit, debit or smart card number and expiry date, which the global authorization computer 28 may verify by communicating with an on-line credit service.

Figure 7C:
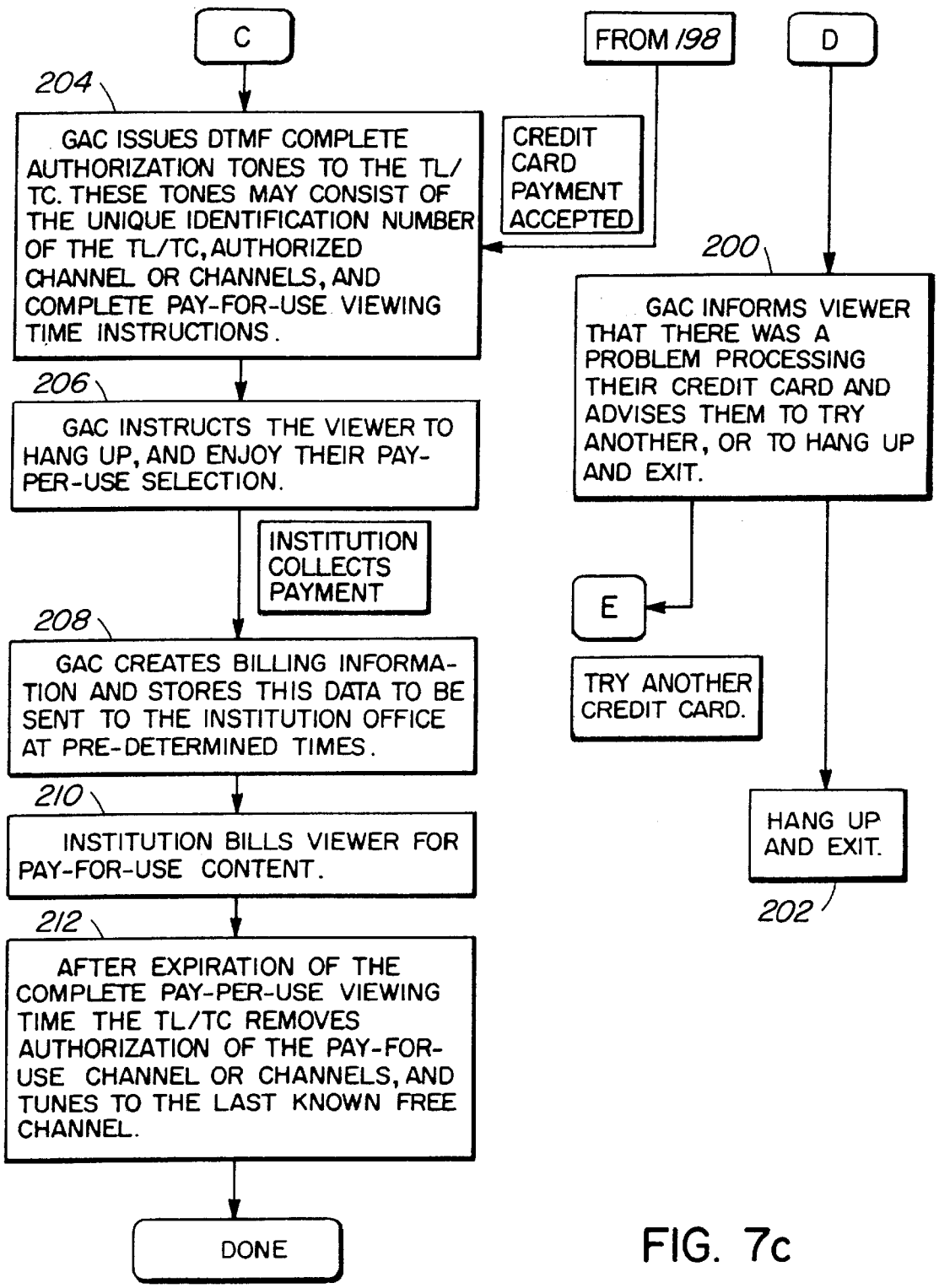

If this verification is not successful, the global authorization computer 28 advises the user at step 200 of FIG. 7c and may either allow additional attempts by returning to step 198, or hang up and exit the routine at step 202. It may be desirable to limit the number of attempts available to the user before hanging up or locking out the room in order to frustrate tampering.

If the global authorization computer 28 is successful in identifying a party to be billed, then an authorization packet for the entire period selected by the user is transmitted to the user's telephone line/television control interface 24 at step 204. This authorization packet may be the same as the pre-view packet, except that it contains an authorization for the entire time period that the user has requested.

At step 206 of FIG. 7c, the global authorization computer 28 now directs the user to hang up the telephone 33 and enjoy their pay-for-use selection.

At step 208, the global authorization computer 28 may then forward billing information to the institution, or to the party offering credit to the user. This follows with an invoice to the user at step 210. In the case of a motel or similar institution, billing information may be transmitted by facsimile transmission or electronically as described above. This transmission may be made immediately, in periodic batches, or at a pre-determined time, such as early in the morning.

Finally, the telephone line/television control interface 24 allows the customer to view the pay-for-use channel until the authorized time period expires, at which point the pay-for-use signal is blocked from the television set 12 at step 212. As described above, the television 12 may be tuned to any non-pay-for-use channel.

If at any point in this method the customer does not reply within a certain time period, the global authorization computer 28 may hang up and the telephone line/television control interface 24 will continue to deny requests to view pay-for-use channels. With the exception of the short pre-viewing period, the global authorization computer 28 secures payment prior to transmitting authorization to view a pay-for-use selection.

The system may also be implemented with authorization, administration and maintenance features available to the motel operator as presented in FIGS. 8a, 8b, 8c, 8d and 8e. The authorization features allow for the remote initialization and set up of telephone line/television control interfaces 24, the administration features allow the motel operator to monitor the billing status of a given room, and the maintenance features allow the motel operator to test a telephone line/television control interface 24, create a channel map for the institution or particular rooms, and to implement security restrictions.

Figure 8A:
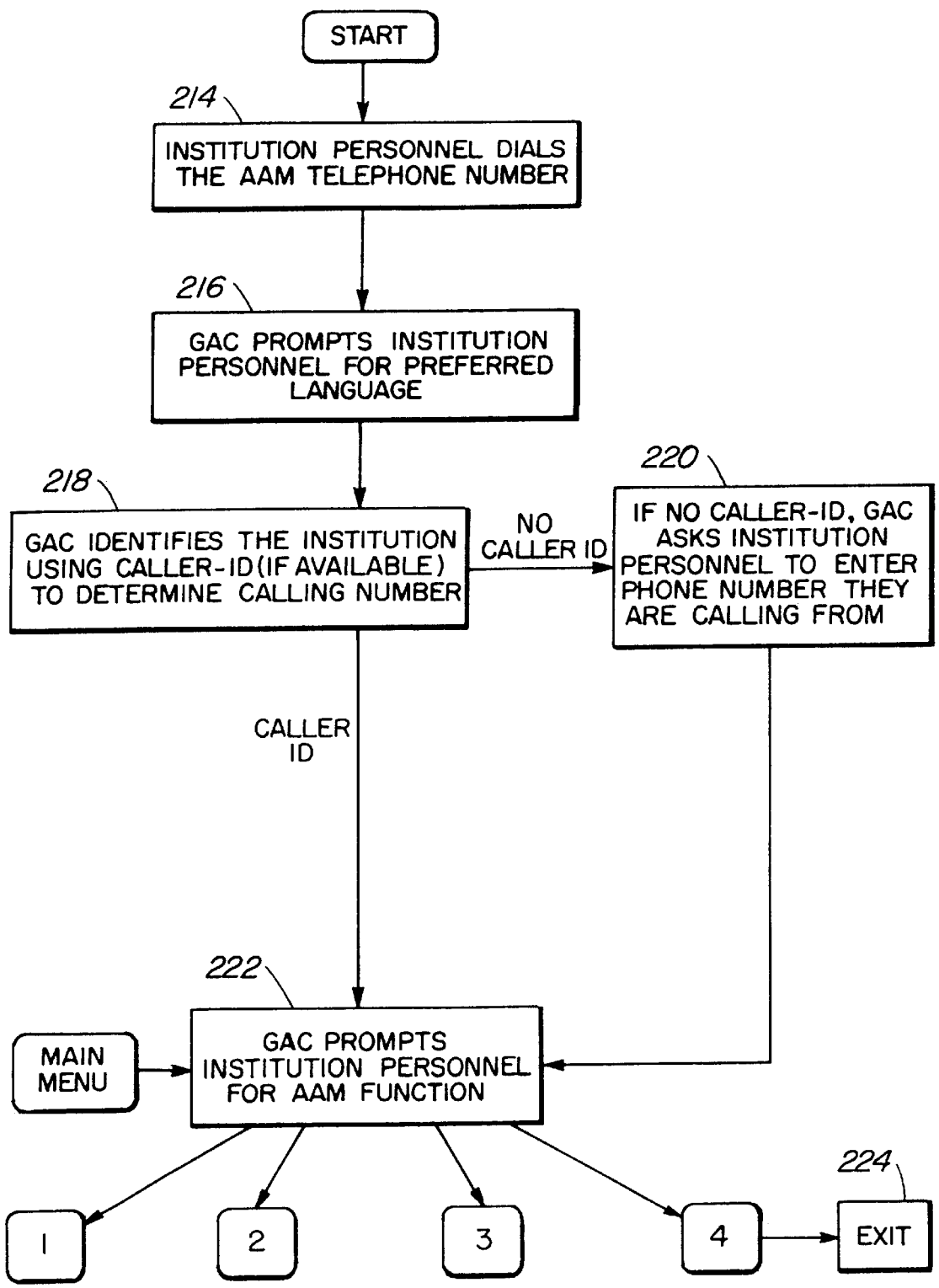
FIGS. 8a, 8b, 8c, 8d and 8e present a flow chart describing the operation of the global authorization computer 28 in an institutional pay-for-use video distribution system 20 in a preferred embodiment of the invention.

These features are accessed by the motel operator dialling the telephone number to access the authorization, administration and maintenance features of the global authorization computer 28 at step 214 of FIG. 8a. The global authorization computer 28 picks up the call at step 216, greets the institution representative and prompts him to identify a preferred language of communication. The motel operator indicates his language preference using a telephone keypad.

If necessary, the motel operator may be required to enter a service access code which is recognized by the global authorization computer 28. As the telephone number of the authorization, administration and maintenance routines of the global authorization computer 28 is not publicly available this is generally not necessary.

At step 218, the global authorization computer 28 identifies the institution using caller identification as known in the art. If caller identification is not available, the global authorization computer 28 asks the institution personnel to enter the telephone number they are calling from using the telephone keypad at step 220.

At this point, the global authorization computer 28 has positively identified the institution that is calling by use of the calling telephone number and may use it to access database records corresponding to that institution. The global authorization computer 28 then presents a number of menu options to the motel operator using interactive voice response at step 222, prompting the motel operator to enter a selection.

In this example, the functions available to the operator will be presented in the three main groupings of authorization, administration and maintenance. These options may be offered to the user as selections 1, 2 and 3 as shown in FIG. 8a, while the selection of option 4, results in an exit from the routine at step 224. On an exit selection, the global authorization computer 28 automatically hangs up.

Figure 8B:
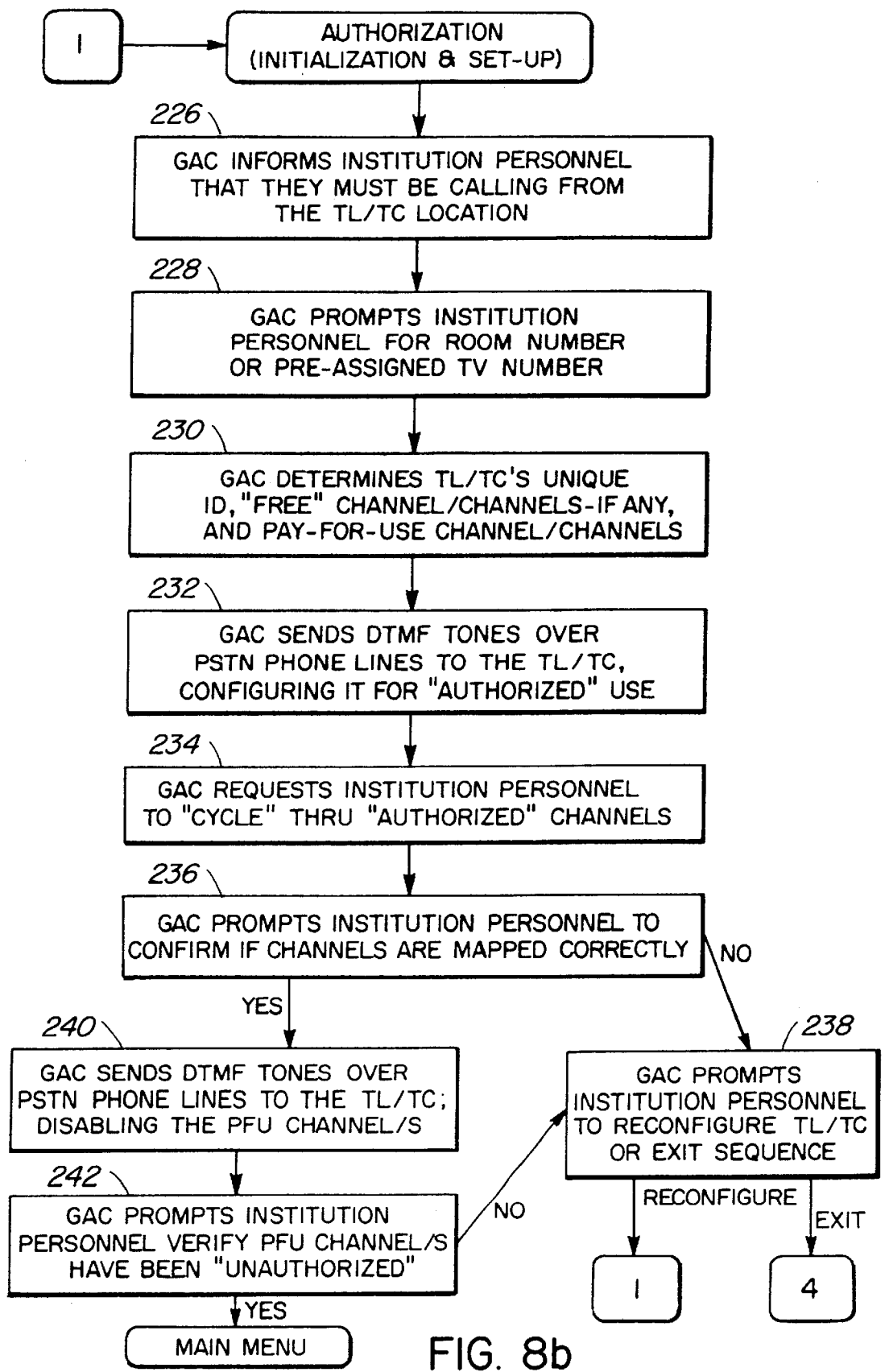

Selection of option 1 from the main menu will allow entry into the authorization routine in FIG. 8b. In the preferred embodiment, the authorization routine allows for initialization and set up of the telephone line/television control interfaces 24, but may also allow other authorization functions to be performed.

At step 226 of this routine, the global authorization computer 28 advises the operator that he must be calling from the location of the telephone line/television control interface 24 that he wishes to initialize or set up. The physical extent of the installation of the system in a new room, is for the motel operator to plug the telephone line/television control interface 24 into the television set 12 and the room telephone jack.

The global authorization computer 28 then prompts the institution operator at step 228 to enter the room number or pre-assigned television number in the room, for which that authorization is to be done. The motel operator responds using the keypad of the telephone 33 in the room 22.

At step 230, the global authorization computer 28 accesses the institution database using the room or television number, and determines the unique identification and channel mapping for the telephone line/television control interface 24. The channel mapping consists of a table that identifies pay-for-use and non-pay-for-use channels, if any, for the institution or room. Further details regarding the channel map are given in the discussion of the maintenance routine with respect to FIGS. 8d and 8e. At step 232, the global authorization computer 28 forwards authorization for all channels in the mapping table to be accessed, and asks the operator to cycle through all the available channels at step 234.

The global authorization computer 28 then prompts the institution personnel to advise whether all of the channels were accessible at step 236. If not, the global authorization computer 28 prompts the institution personnel at step 238 to either reconfigure the telephone line/television control interface 24 by returning to step 228, or to exit the routine at step 224.

If all of the channels were accessible, the global authorization computer 28 then transmits a packet which withdraws the authorization for the pay-for-use channels at step 240, and prompts the operator to verify that the pay-for-use channels are no longer accessible at step 242. If this test is successful, the operator is returned to the main menu at step 224. If this test is unsuccessful, the operator is returned to step 238.

Figure 8C:
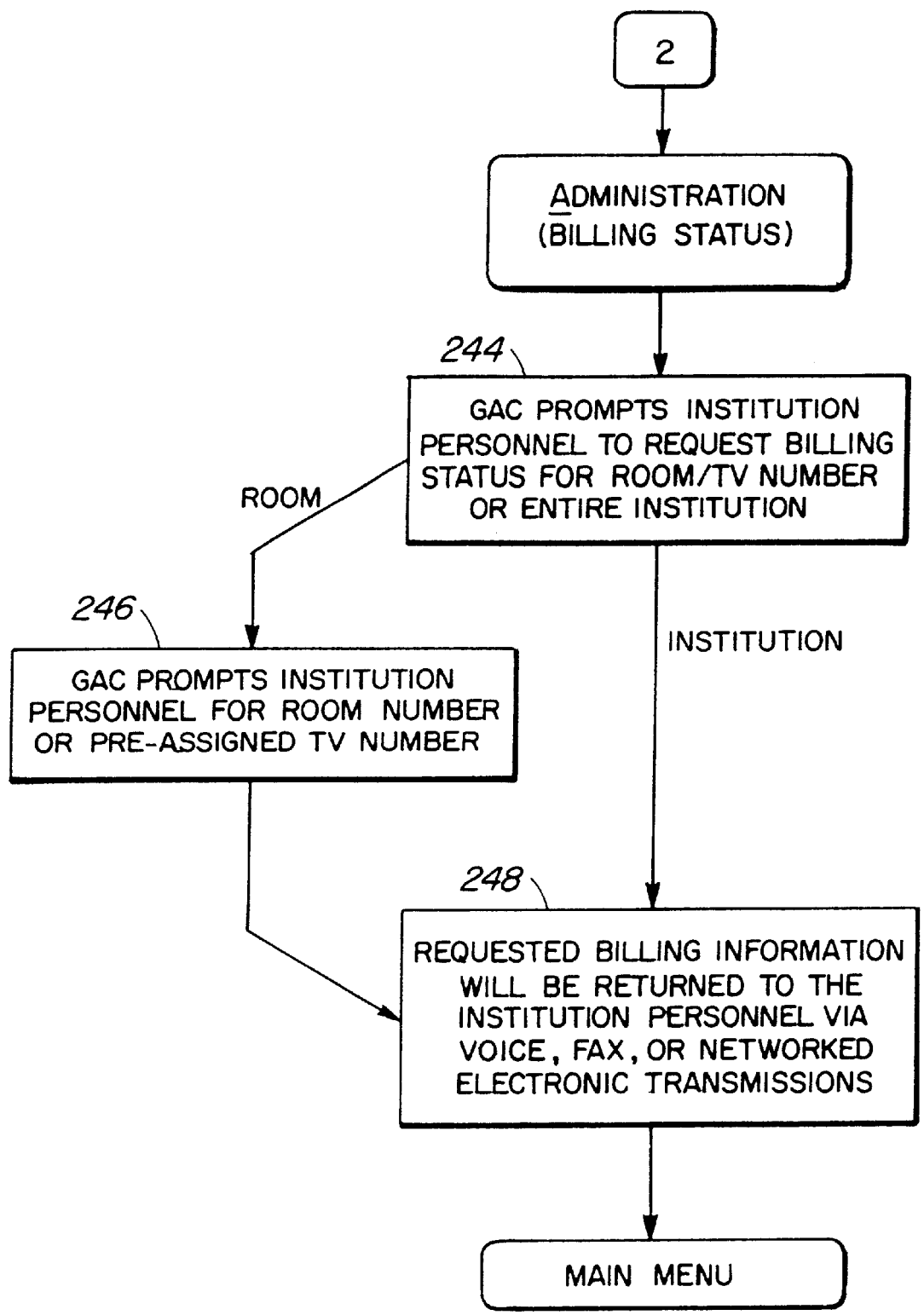

Selection of option 2 from the main menu will allow entry into the administration routine in FIG. 8c. In the preferred embodiment, the administration routine allows the operator to query the billing status of either a given room number or the entire institution. At step 244 the global authorization computer 28 prompts the operator to indicate whether billing information is required for a particular room or for the entire institution. If a single room is indicated, then the global authorization computer 28 prompts the operator to identify the room at step 246.

The global authorization computer 28 then prepares the requested billing information and forwards it to the operator either via voice, facsimile transmission or electronic transmission as described hereinabove, at step 248. Control is then returned to the main menu at step 222.

Figure 8D:
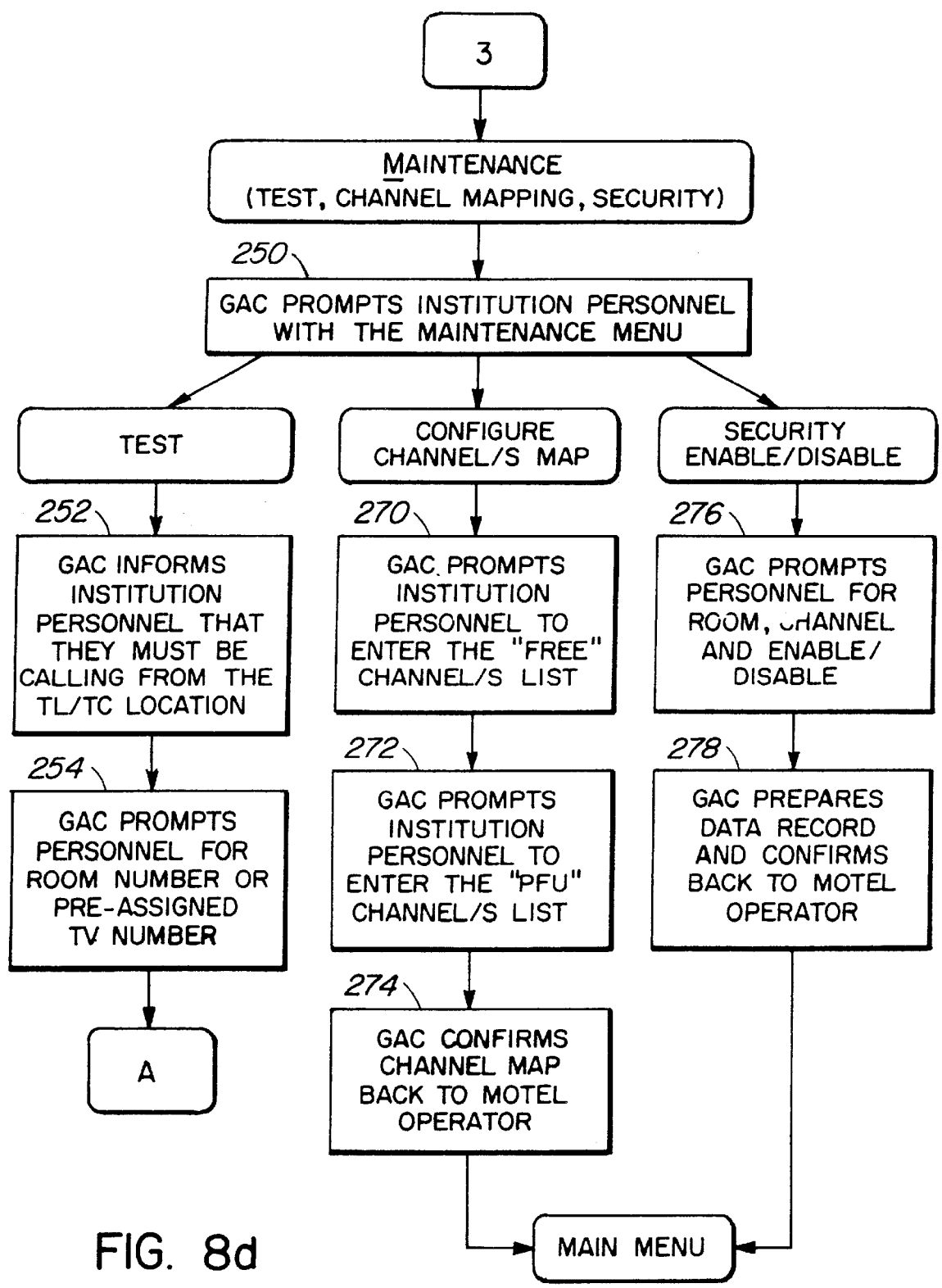
Figure 8E:
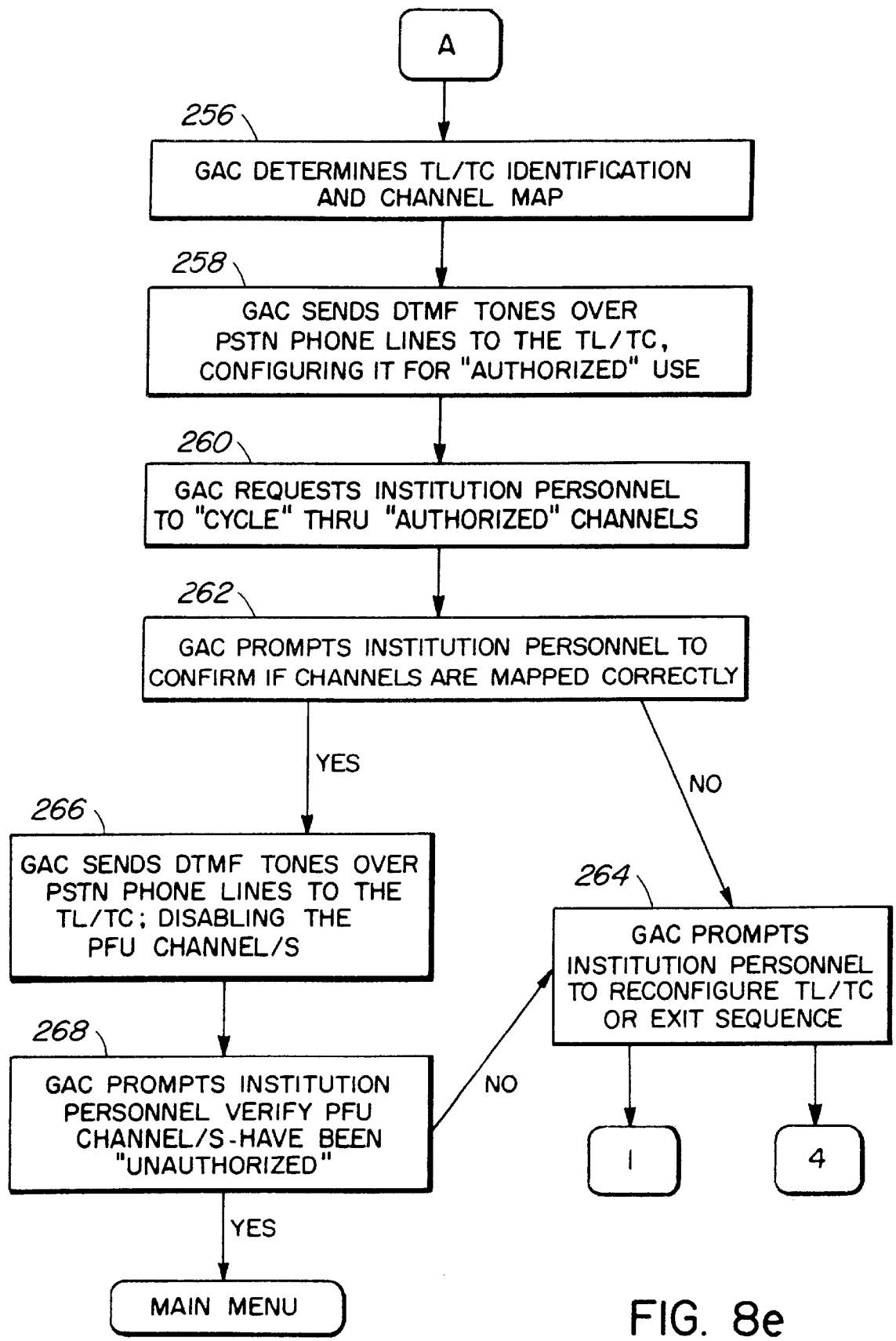

Selection of option 3 from the main menu allows the motel operator to access the maintenance routine in FIGS. 8d and 8e. In the preferred embodiment, the maintenance routine allows the operator to test a telephone line/television control interface 24, configure the channel mapping for the institution or apply security limitations to a given room.

At step 250 the global authorization computer 28 prompts the motel operator to select which of the available maintenance routines he wishes to execute. Although only three routines are shown as examples, implementation of other maintenance routines would be clear to one skilled in the art.

If the operator selects the test routine, control passes to step 252. The steps of the test routine are similar to those of the authorization routine of FIG. 8b, except that the authorization routine programs the telephone line/television control interface 24 while the test routine, only performs an online test of the telephone line/television control interface 24 operation.

At step 252 of this routine, the global authorization computer 28 advises the operator that he must be calling from the location of the telephone line/television control interface 24 that he wishes to test.

The global authorization computer 28 then prompts the institution at step 254 to enter the room number or pre-assigned television number that the operator wishes to test, and the global authorization computer 28 verifies that this number is valid.

FIG. 8e presents the remaining steps. At step 256, the global authorization computer 28 accesses the institution database using the room or television number indicated at step 254, and determines the unique identification and channel mapping for the given telephone line/television control interface 24. At step 258, the global authorization computer 28 forwards authorization for all channels in the mapping table, and asks the operator to cycle through all the available channels at step 260.

At step 262, the global authorization computer 28 then prompts the institution personnel to advise whether all of the channels were accessible. If not, the global authorization computer 28 prompts the institution personnel at step 264 to either reconfigure the telephone line/television control interface 24 by returning to step 226 of FIG. 8b, or to leave the authorization, administration and maintenance routine at step 224.

If the operator confirms that all of the channels were accessible, the global authorization computer 28 then transmits a packet which withdraws the authorization of the pay-for-use channels at step 266, and prompts the operator to verify that the pay-for-use channels are no longer accessible at step 268. If this test is successful, the operator is returned to the main menu at step 222. If this test is unsuccessful, the operator is returned to step 264, described above.

If either of the tests at step 262 or 268 fail, the operator may re-configure and re-test the telephone line/television control interface 24. If the operator is not able to get the device to operate correctly, it may be removed and a new telephone line/television control interface 24 plugged into the telephone 33 and television 12. The new telephone line/television control interface 24 may then be initialized using the authorization routine starting at step 226.

Returning again to FIG. 8d, the method of channel mapping will now be described. In the preferred embodiment of the invention, an institution has a single channel mapping scheme that is common to all rooms. That is, all of the rooms in the motel may have non-pay-for-use access to the same set of channels, and pay-for-use access to a second set of channels. Thus, the global authorization computer 28 is only required to have a single data record for the channel map of the institution. However, it would be straightforward for the global authorization computer 28 to store more than one channel map that would apply to different rooms or sets of rooms. This would require more memory at the global authorization computer 28, and require more time to program, but may be desired in some cases. For example, a larger hotel may have more expensive rooms or business suites in which they intend to provide access to certain pay-for-use services with the cost of the room or suite.

Configuration of the channel mapping maintenance routine begins at step 270 where the global authorization computer 28 prompts the operator to enter the television channels that are to be accessed free of charge. Entry is made using the keypad of the operator's telephone 33, or may be done electronically, using methods known in the art. At step 272, the global authorization computer 28 then prompts the operator to enter the pay-for-use television channels. Again, the operator may indicate selections by use of the telephone 33 keypad, or electronically.

The global authorization computer 28 then confirms the selections back to the motel operator at step 274. This confirmation may be done by voice, facsimile transmission, or electronically. The operator is then returned to the main menu at step 222.

If the motel operator selects the security routine from the maintenance menu at step 250, control is passed to step 276. As discussed above, the security feature allows customers to disable certain pay-for-use channels from being selected. This may be desired to prevent adult channels from being ordered by a room, or for corporate clients to prevent their employees from charging excessive costs to their rooms.

If a customer makes such a request to the operator, the operator accesses the security routine and is prompted at step 276 to identify the room, the channels involved, and whether they are to be disabled or enabled. The operator makes these selections using the keypad of his telephone.

At step 278, the global authorization computer 28 then confirms that the security request is acceptable and executes the disabling or enabling by preparing a note in the database record for that room of the institution. The global authorization computer 28 then confirms back to the operator that the security action has been executed. This confirmation may be done by voice, facsimile transmission, or electronically.

Addition of other authorization, administration and maintenance routines would be clear to one skilled in the art in view of the teachings herein.

Depending on how the invention is implemented, the motel operator may interact with the invention as follows:
1. invoicing customers for video services provided;
2. loading video tapes into video playback machines as directed by the global authorization computer 28;
3. initializing or setting up telephone line/television control interfaces 24 by dialling the global authorization computer 28 and entering the necessary administration code and room number;
4. performing network testing of telephone line/television control interfaces 24 by dialling the global authorization computer 28 and entering the necessary administration code; and
5. querying the global authorization computer 28 for billing data of either a particular room, or the entire institution.

The global authorization computer 28 will generally have complementary functionality to perform the following:
1. authorizing specific channel access and time intervals via the dual-tone multi-frequency/interactive voice response authorization system;
2. providing billing information to the institution;
3. providing pre-recorded video programming to institutions, and possibly negotiating cable or satellite contracts on behalf of their client institutions because of their much greater bargaining power;
4. providing promotional materials such as preview or "barker" tapes, posters and display cards;
5. providing network testing of the telephone line/television control interfaces 24;
6. coordinating the provision and repair of telephone line/television control interfaces 24;
7. controlling operation of video playback machines 52 at the institution;
8. maintaining an institutional account which includes records of the institution's telephone number, numbers of outgoing telephone lines, room numbers, services available, free channels, costs, billing arrangements and identifications of telephone line/television control interfaces 24.

Because of the centralised authorization, administration and maintenance that the invention provides, it is straightforward and inexpensive to add further features. Some optional features are as follows:
1. Electronic equipment such as video games, video playback devices or computers could be installed in the customer's room. The telephone line/television control interface 24 could be programmed to deny passing of the channel that the electronic equipment is outputting to the television 12 unless authorization is obtained, allowing the customer to be charged for use of the electronic equipment.
2. For added security, the room identification number could be changed with each communication between the global authorization computer 28 and the telephone line/television control interface 24, a new identification number being stored at both locations at the end of a session. Techniques for generating such random numbers and "one-time passwords" are well known in the art of computer programming.
3. Because the telephone line/television control interface 24 has the functionality to assume what channel is being viewed and to calculate the passing of time, products could be sold on the basis of actual viewing time rather than elapsed time. This would allow, for example, a customer to purchase four hours of viewing time of a sports channel, and to use that viewing time over an extended period.

4. Rather than having the customer confirm proper operation at step 192 as described herein, the global authorization computer 28 could place a telephone call back to the customer to confirm his selection and parameters. This would provide for greater security and reliability, but if the motel has a PBX system this require additional hardware so that the global authorization computer 28 may bypass the PBX system to call the customer directly. If this call is not answered after three attempts, the global authorization computer 28 will direct the telephone line/television control interface 24 to tune the television 12 to a non-pay-for-use channel. If the institutional pay-for-use system 20 was implemented with the functionality for the global authorization computer 28 to dial the telephone line/television control interface 24, then the authorization and maintenance routines described above could be implemented from a central location, rather than requiring the motel operator to be in the room with the subject telephone line/television control interface 24.

5. Another alternative to step 192, is for the telephone line/television control interface 24 to generate appropriate dual-tone multi-frequency codes to confirm receipt of the authorization packet and to confirm the request from the User to tune to the appropriate channel. However, this implementation would require additional hardware for the telephone line/television control interface 24 to generate the dual-tone multi-frequency codes and additional software. This functionality is not required in the basic implementation of the invention, but could easily be added by one skilled in the art from the teachings herein.

The above advantages are illustrative of certain implementations of the invention, and are not intended to be limiting. The extent to which the above advantages are realized for a given implementation would be clear to one skilled in the art.

Although the detailed operation has been described with respect to method steps, clearly the invention may be embodied by a combination of software and hardware. From the description given, it is within the skill of the art to implement the invention in a combination of software and hardware. The embodiments as presented herein are intended to be illustrative and not limiting.

While particular embodiments of the present invention have been shown and described, it is clear that changes and modifications may be made to such embodiments without departing from the true scope and spirit of the invention. For example, the remote control of the television could be performed using ultrasonic or radio frequency transmission rather than infrared, or without remote control at all, and still realize the benefits of the invention. These and other modifications would be clear to one skilled in the art from the teachings of the invention.

What is claimed is:

1. A television system comprising:
   a television set having a video signal input;
   a television appliance being electrically connected to said video signal input of said television set;
   a hand-held remote control device being operable to transmit a tuning signal representing a selected channel;
   said television appliance being operable to:
   receive said tuning signal representing said selected channel; and
   transmit a video signal to said television set via said electrical connection at the frequency corresponding to said selected channel; and
   said television set being operable to:
   receive said tuning signal representing said selected channel; and
   receive and display said video signal from said television appliance at the frequency corresponding to said selected channel.

2. A television system as claimed in claim 1, wherein said television appliance includes a memory storing a plurality of remote control protocols for decoding said tuning signal and is further operable to allow selection of one of said remote control protocols, whereby a User can select a remote control protocol compatible with that of said television set.

3. A television system as claimed in claim 2, wherein said television appliance is further operable to:
   receive a broadband video signal and to demodulate said selected channel to an intermediate frequency signal; and
   modulate said intermediate frequency signal to a video signal at the frequency of said selected channel.

4. A system for distributing video signals comprising:
   at least one customer location having:
   a television set having a video signal input;
   a telephone line/television control interface being electrically connected to said video signal input of said television set; and
   a hand-held remote control device being operable to transmit a tuning signal representing a selected channel;
   a local source of video signals;
   a global authorization computer;
   a local video signal distribution network interconnecting said local source of video signals with said telephone line/television control interface;
   a telecommunications network for interconnecting said global authorization computer with said telephone line/television control interface;
   said television set including means for receiving said tuning signal and tuning said television set to said selected channel;
   said global authorization computer including means for issuing an authorization packet to said telephone line/television control interface via said telecommunications network; and
   said telephone line/television control interface including:
   means for receiving said tuning signal from said hand-held remote control device;
   means for receiving an authorization packet authorizing viewing of a pay-for-use channel, from said global authorization computer via said telephone network; and
   controlling means responsive to said selected channel being said pay-for-use channel and said authorization to view said pay-for-use channel being received by passing said selected channel at the transmitted frequency of said selected channel.

5. A system for distributing video signals as claimed in claim 4 wherein said means for issuing an authorization packet to said telephone line/television control interface via said telecommunications network comprises means for issuing an authorization packet in dual-tone multi-frequency format containing authorized user room identification, authorized channel and authorized period of time to said telephone line/television control interface via said telecommunications network.

6. A system for distributing video signals as claimed in claim 5 wherein said controlling means comprises controlling means responsive to said selected channel being said pay-for-use channel, said authorization to tune to said pay-for-use channel being received and said authorized user room identification corresponding to an internally coded room identification, by passing said selected channel at the transmitted frequency of said selected channel.

7. A system for distributing video signals as claimed in claim 6 wherein:

said local source of video signals is located in an institutional environment including said at least one customer location, with means for receiving billing information from said global authorization computer via said telecommunications network; and said global authorization computer comprises means for transmitting said billing information to an administrative office of said institutional environment via said telecommunications network.

8. A system for distributing video signals as claimed in claim 7 wherein said at least one customer location has a telephone connected to said telecommunications network and said global authorization computer further comprises:

means for identifying said institutional environment of said at least one customer;

means for prompting said at least one customer for a room identification via said telephone and said telecommunications network;

means for receiving said room identification;

means for prompting said at least one customer for a video signal selection said telephone and said telecommunications network;

means for receiving said desired video signal selection; and means for transmitting billing information to said administrative office of said institutional environment.

* * * * *